(12) United States Patent
Tran et al.

(10) Patent No.: US 7,011,109 B2
(45) Date of Patent: Mar. 14, 2006

(54) DRAG BALL VALVE

(75) Inventors: Duc Thanh Tran, Corona, CA (US); Raymond R. Newton, Rancho Santa Margarita, CA (US); Paul Smirl, Dana Point, CA (US); Roger Bey, Illzach (FR); Tina Benac, Dana Point, CA (US)

(73) Assignee: Control Components, Inc., Rancho Santa Margarita, CA (US)

( * ) Notice: Subject to any disclaimer, the term of this patent is extended or adjusted under 35 U.S.C. 154(b) by 353 days.

(21) Appl. No.: 10/122,276

(22) Filed: Apr. 12, 2002

(65) Prior Publication Data

US 2003/0192605 A1 Oct. 16, 2003

(51) Int. Cl.
*F16K 11/087* (2006.01)

(52) U.S. Cl. .................................. 137/625.32; 251/118
(58) Field of Classification Search ............ 137/625.32, 137/625.3; 251/118
See application file for complete search history.

(56) References Cited

U.S. PATENT DOCUMENTS

| | | | |
|---|---|---|---|
| 4,530,375 A | * 7/1985 | Bey | ....................... 137/625.32 |
| 4,540,025 A |   9/1985 | Ledeen | |
| 4,665,946 A |   5/1987 | Hulsey | |
| 5,180,139 A | * 1/1993 | Gethmann et al. | ...... 137/625.32 |
| 5,218,984 A | * 6/1993 | Allen | ............................. 137/1 |
| 5,509,446 A | * 4/1996 | Bey | ...................... 137/625.32 |
| 5,680,889 A | * 10/1997 | Boger | ................... 137/625.32 |
| 5,771,929 A | * 6/1998 | Boger | ................... 137/625.32 |
| 5,937,901 A |   8/1999 | Bey | |

* cited by examiner

*Primary Examiner*—John Fox
(74) *Attorney, Agent, or Firm*—Stetina Brunda Garred & Brucker

(57) ABSTRACT

A valve assembly comprising a rotary closure element which defines an axis of rotation and is selectively movable between a fully open position and a fully closed position. Mounted to and movable with the rotary closure element is an impedance assembly. The impedance assembly defines an inflow end and an outflow end, and comprises a plurality of tortuous passageways which extend from the inflow end to the outflow end. Also fully or partially defined by the impedance assembly is an enlarged flow opening which extends from the inflow end to the outflow end. The tortuous passageways and the flow opening are oriented relative to each other such that a portion of a flow through the valve assembly is directed into the tortuous passageways and a portion of the flow is directed through the flow opening when the closure element is in the fully open position.

13 Claims, 17 Drawing Sheets

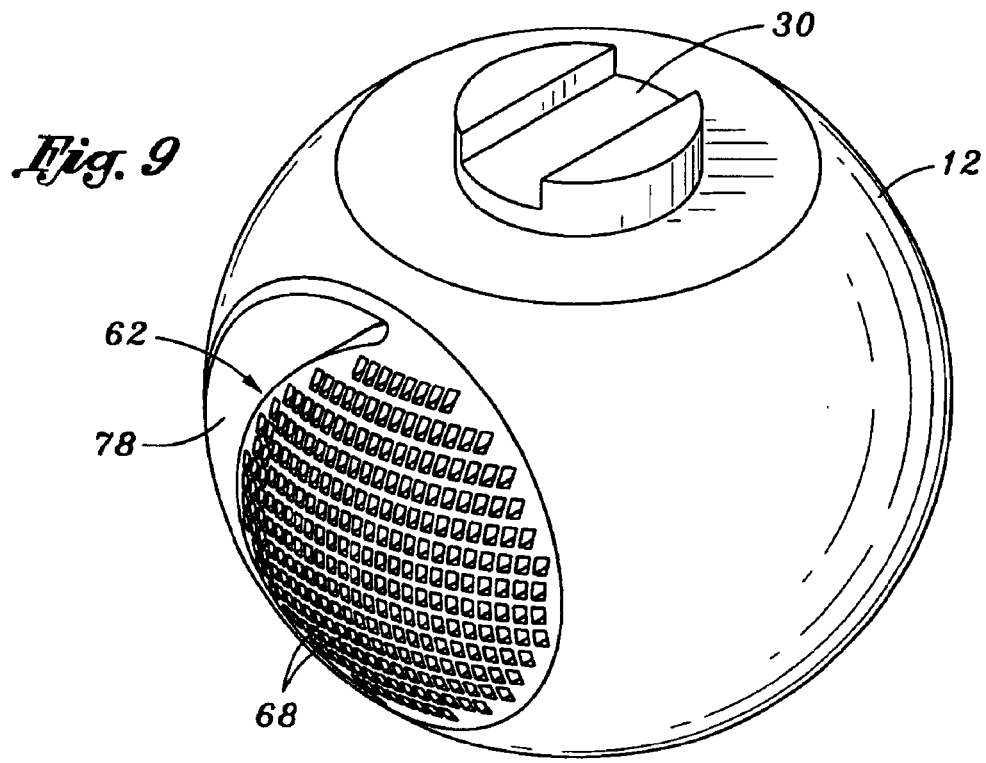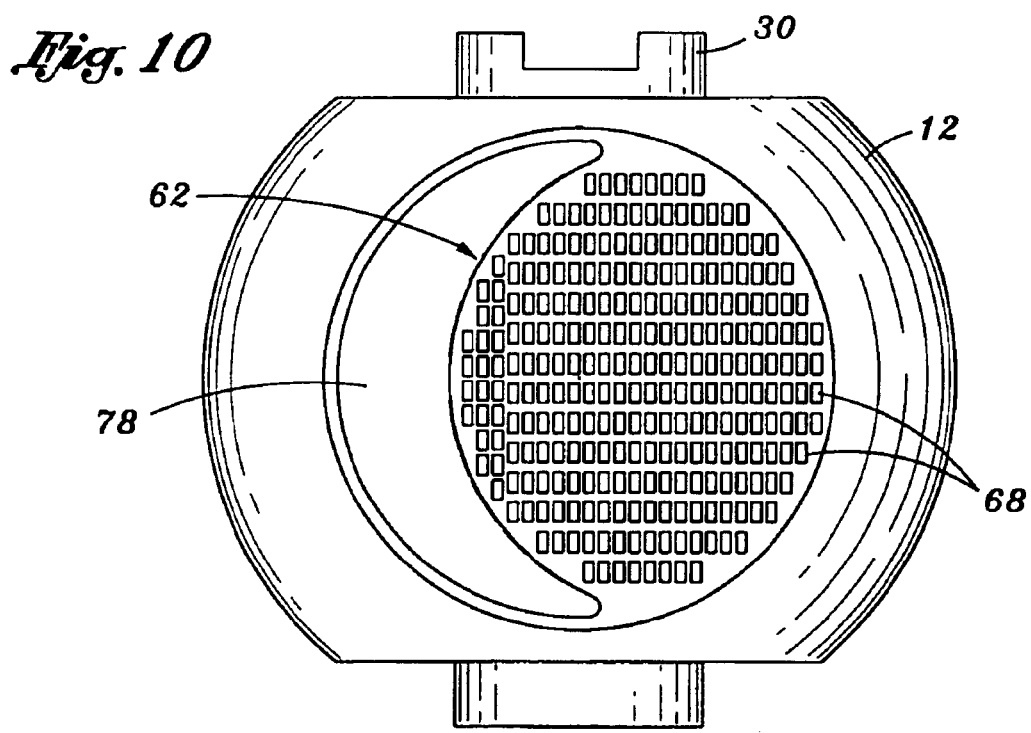

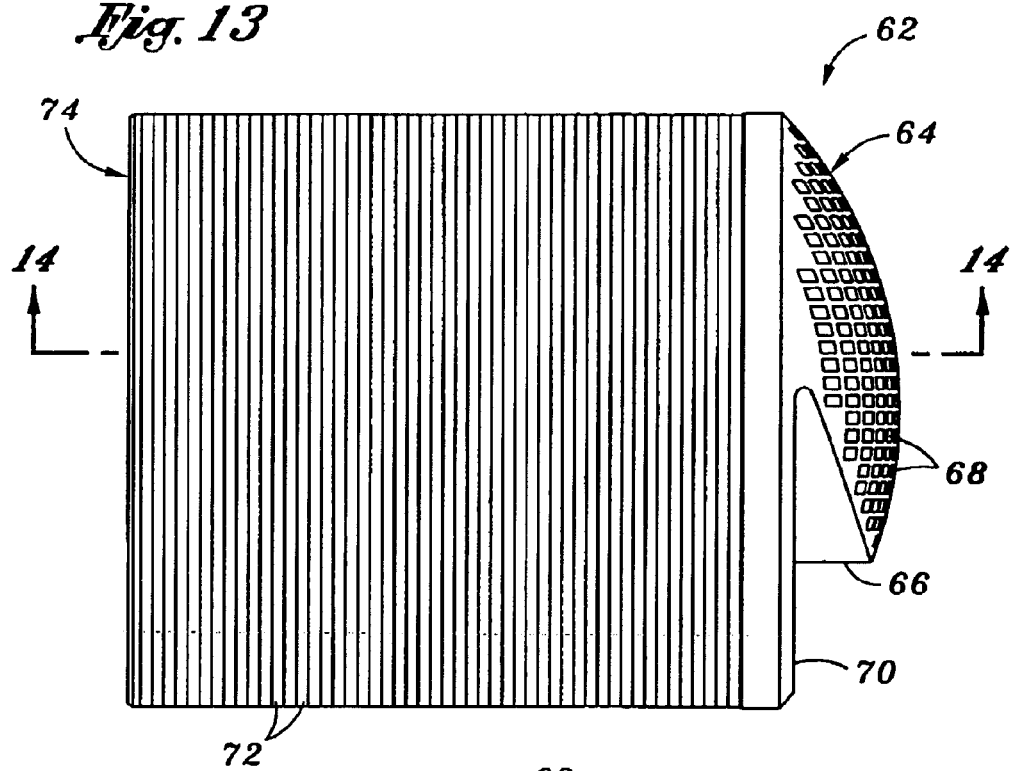
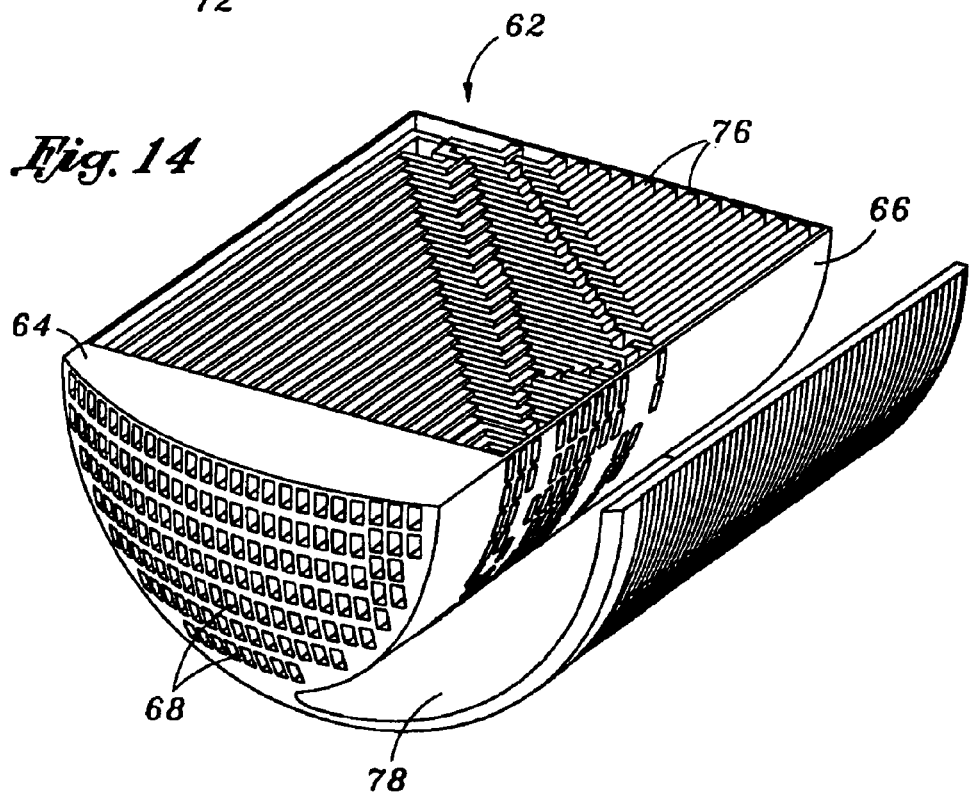

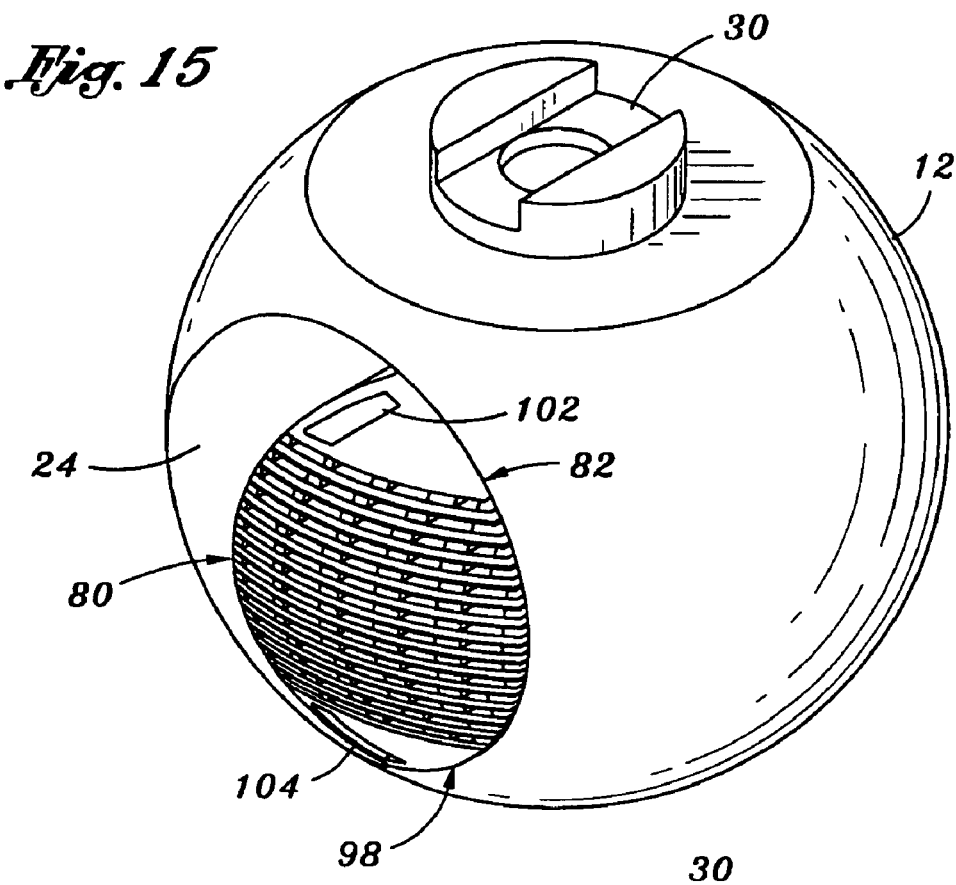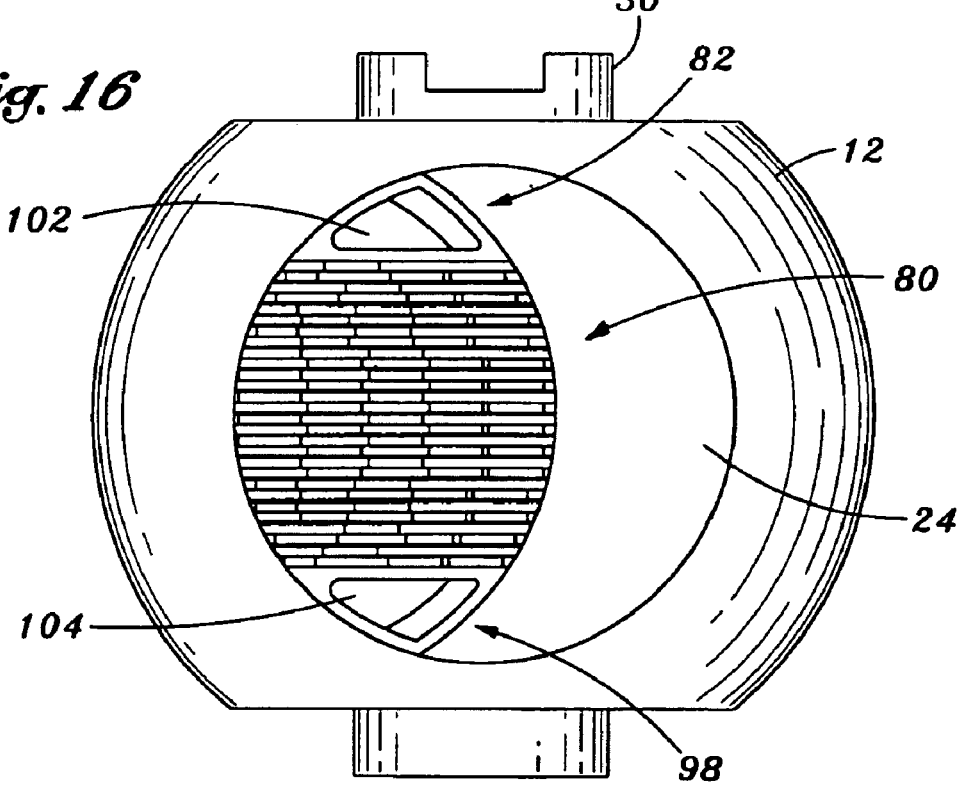

DRAG BALL VALVE

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

1. Field of the Invention

The present invention relates generally to rotary valves, and more particularly to an energy attenuating ball valve which includes an impedance assembly mounted within and movable with the closure element or "ball" of the ball valve.

2. Discussion of Background

There is currently known in the prior art linear valve assemblies which are outfitted to include a noise attenuation or impedance assembly. Such valves are often referred to in the relevant industry as "drag valves". Linear valves as currently known in the prior art typically include an annular impedance assembly which includes a plurality of flow passages extending radially therethrough. The impedance assembly may comprise, for example, a plurality of annular disks which each define a plurality of radially extending, tortuous flow passages and are secured to each other in a stacked arrangement. Disposed within the interior of the impedance assembly is a piston which is cooperatively engaged to an actuator operative to facilitate the reciprocal movement of the piston within the impedance assembly. When the piston is in a lowermost position, none of the passages of the impedance assembly are exposed to an incoming flow. As the piston is moved upwardly toward an open position, flow passes through the passages of the impedance assembly to provide an exit flow through the linear valve. The amount of flow through the impedance assembly is varied by the position of the piston, which in turn varies the area or proportion of the impedance assembly exposed to the incoming flow within the interior thereof.

Though the above-described linear valve arrangement provides significant noise reduction capabilities, in certain applications it is often desirable to employ the use of a rotary valve utilizing a rotary closure element as an alternative to a linear valve. Since currently known linear impedance valves are typically considered to provide superior noise reduction capabilities as compared to rotary valves, the present invention addresses this disparity by providing a rotary valve arrangement which retains the benefits of the impedance assembly associated with linear valves, while still employing the use of a rotary closure element. As will be discussed in more detail below, in the present invention, the impedance assembly is carried by the rotary closure element of the rotary or ball valve which may be adapted for use in large, high capacity applications for which an equivalent linear valve would be excessively expensive (attributable to manufacturing obstacles) and potentially susceptible to instability problems. These, and other advantages of the present invention, will be discussed in more detail below.

BRIEF SUMMARY OF THE INVENTION

In accordance with the present invention, there is provided a valve assembly comprising a rotary closure element defining an axis of rotation and selectively movable between a fully open position and a fully closed position. Mounted to and movable within the rotary closure element is an impedance assembly. The impedance assembly defines an inflow end and an outflow end, and comprises a plurality of tortuous passageways which extend from the inflow end to the outflow end. The impedance assembly may also include an enlarged flow opening which extends from the inflow end to the outflow end thereof or, in an alternative embodiment, may partially define a flow opening which extends through at least a portion of the bore of the rotary closure element into which the impedance assembly is mounted. The tortuous passageways and such flow opening are oriented relative to each other such that a portion of flow through the valve assembly is directed into the tortuous passageways, with a portion of the flow being directed through the flow opening when the closure element is in its fully open position.

In certain embodiments of the present invention, the tortuous passageways are, in their entirety, upstream of the axis of rotation of the closure element when the same is in its fully open position. In another embodiment of the present invention, some of the tortuous passageways are completely upstream of the axis rotation, with some of the tortuous passageways including upstream and downstream segments which extend upstream and downstream of the axis of rotation. The tortuous passageways of each embodiment each define a series of turns which extend at generally right angles relative to each other, with such tortuous passageways defining differing numbers of turns.

The impedance assembly is interfaced to the rotary closure element such that flow through the valve assembly is applied initially to the tortuous passageways having a greater number of turns when the closure element is moved from its fully closed position toward its fully open position.

The impedance assembly comprises a series of plates which are secured to each other in a stacked arrangement. Each of the plates includes a plurality of flow passages (e.g., slots, openings, etc.) formed therein which collectively define the tortuous passageways when the plates are stacked upon each other. In certain embodiments of the present invention, the impedance assembly is constructed such that the stacked plates extend along the axis of the bore of the closure element into which the impedance assembly is mounted. In another embodiment of the present invention, the plates are stacked so as to extend along an axis which is generally perpendicular or normal to the axis of the bore (i.e., extends in generally parallel relation to the axis of rotation of the closure element). The surface(s) of the plate(s) individually or collectively defining the inflow end of the impedance assembly are preferably arcuately contoured so as to extend in substantially flush or continuous relation to the outer surface of the generally spherical closure element.

BRIEF DESCRIPTION OF THE DRAWINGS

These, as well as other features of the present invention, will become more apparent upon reference to the drawings wherein:

FIG. 9 is a front perspective view of a closure element including an impedance assembly constructed in accordance with a second embodiment of the present invention;

FIG. 10 is a front elevational view of the closure element and impedance assembly shown in FIG. 9;

FIG. 13 is a side-elevational view of the impedance assembly of the second embodiment;

FIG. 14 is a cross-sectional view of the impedance assembly of the second embodiment;

FIG. 15 is a front perspective view of a closure element including an impedance assembly constructed in accordance with a third embodiment of the present invention;

FIG. 16 is a rear elevational view of the closure element and impedance assembly shown in FIG. 15;

DETAILED DESCRIPTION OF THE INVENTION

Figure 1:
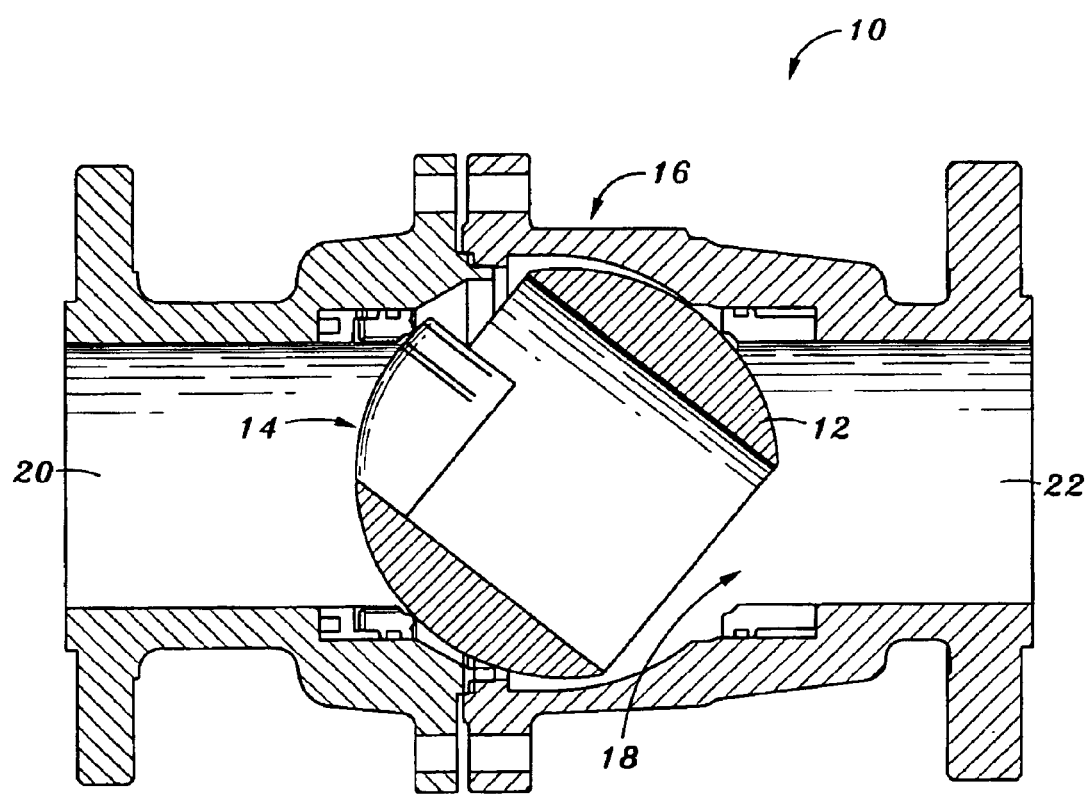
FIG. 1 is a cross-sectional view of an exemplary rotary valve having a closure element including an impedance assembly constructed in accordance with a first embodiment of the present invention.
Figure 4:
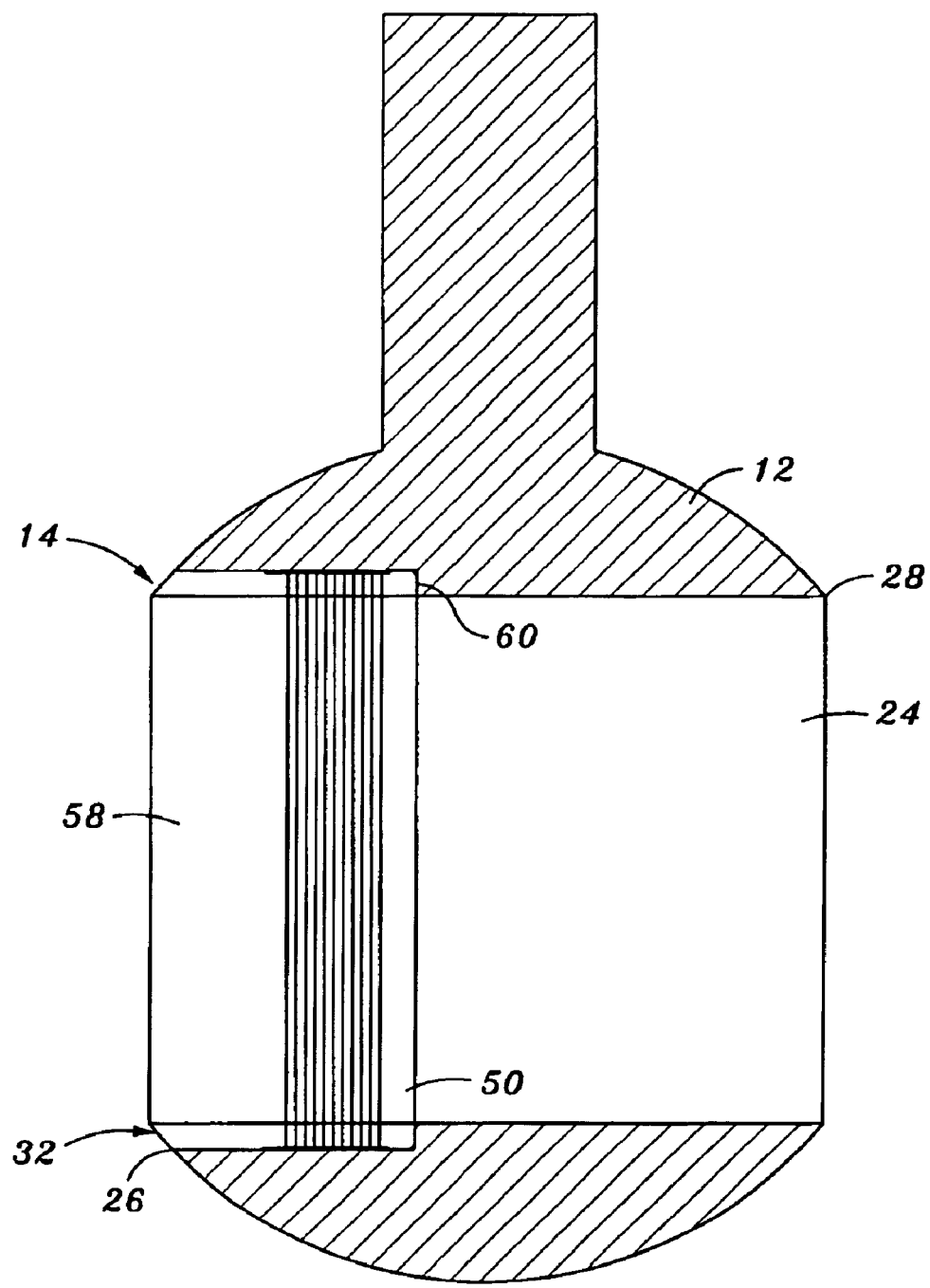
FIG. 4 is a cross-sectional view of the closure element and impedance assembly shown in FIGS. 2 and 3.
Figure 5:
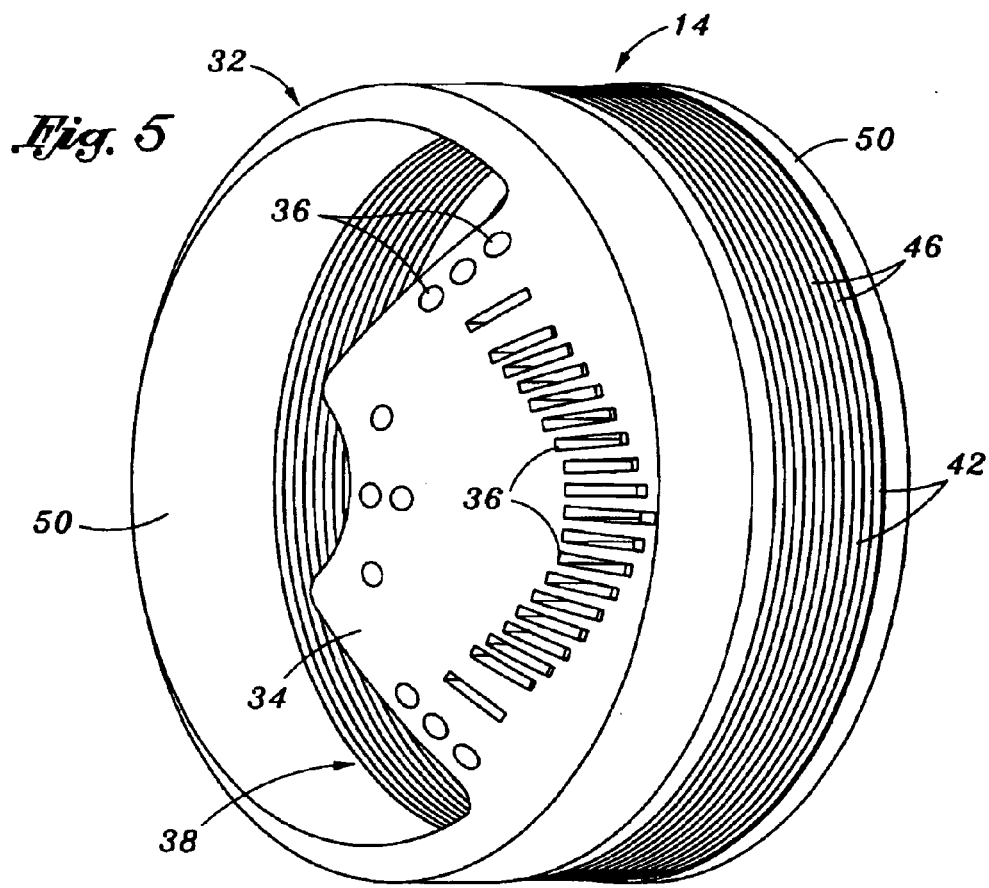
FIG. 5 is a front perspective view of the impedance assembly of the first embodiment.

Referring now to the drawings wherein the showings are for purposes of illustrating preferred embodiments of the present invention only, and not for purposes of limiting the same, FIG. 1 provides a cross-sectional view of a rotary valve 10 (e.g., a ball valve) having a rotary closure element 12 (e.g., a ball) outfitted to include an on-board impedance assembly 14 constructed in accordance with a first embodiment of the present invention. The valve 10 includes a housing 16 which defines a flow path 18 extending axially therethrough. The closure element 12 is operatively positioned within the flow path 18 of the housing 16, and effectively segregates the flow path 18 into an inflow section 20 and an outflow section 22. As best seen in FIG. 4, the closure element 12 defines a bore 24 which extends axially therethrough. The formation of the bore 24 within the closure element 12 truncates opposed ends of the closure element 12 which otherwise has a generally spherical shape. In this regard, the bore 24 includes an inflow end 26 and an outflow end 28 which are each defined by the closure element 12.

As further seen in FIG. 4, attached to the closure element 12 is a stem 30. The stem 30 extends radially from the closure element 12 in substantially perpendicular relation to the axis of the bore 24. In the valve 10, the closure element 12 is oriented within the flow path 18 such that the axis of the bore 24 is selectively placeable into coaxial alignment with the axis of the flow path 18, with the axis of the stem 30 extending in generally perpendicular relation to the axis of the flow path 18. In this regard, the actuation of the closure element 12 to a fully open position causes fluid flowing through the inflow section 20 of the flow path 18 to flow into the inflow end 26 of the bore 24 along the axis thereof and subsequently into the outflow section 22 of the flow path 18 via the outflow end 28 of the bore 24. When actuated to its fully closed position, the closure element 12 is rotated such that the axis of the bore 24 extends in generally perpendicular relation to the axis of the flow path 18, thus blocking the flow of fluid through the flow path 18 due to the impingement of the fluid flowing through the inflow section 20 against a side of the closure element 12.

As will be recognized, the closure element 12 may be rotated to various degrees of an open position between its fully open position and its fully closed position, i.e., the axis of the bore 24 may extend at an angle of between zero degrees and ninety degrees relative to the axis of the flow path 18. In FIG. 1, the closure element 12 is shown as being rotated into an orientation wherein the axis of the bore 24 extends at an angle of approximately forty-five degrees relative to the axis of the flow path 18, thus placing the valve 10 into a partially open state. Those of ordinary skill in the art will recognize that the structural attributes of the valve 10 are exemplary only, and that the impedance assembly 14 of the first embodiment of the present invention as will be described in more detail below may be employed in a multiplicity of differently configured rotary valves.

Referring now to FIGS. 2–8, there is shown the impedance assembly 14 which is constructed in accordance with the first embodiment of the present invention. As indicated above, the impedance assembly 14 is carried by the closure element 12, and more particularly is operatively positioned within the bore 24 in a manner which will be described in more detail below. As will also be discussed below, the structural attributes of the impedance assembly 14 allow the same to be retrofitted to the closure element 12 of an existing valve 10, or provided as an original component thereof.

Figure 2:
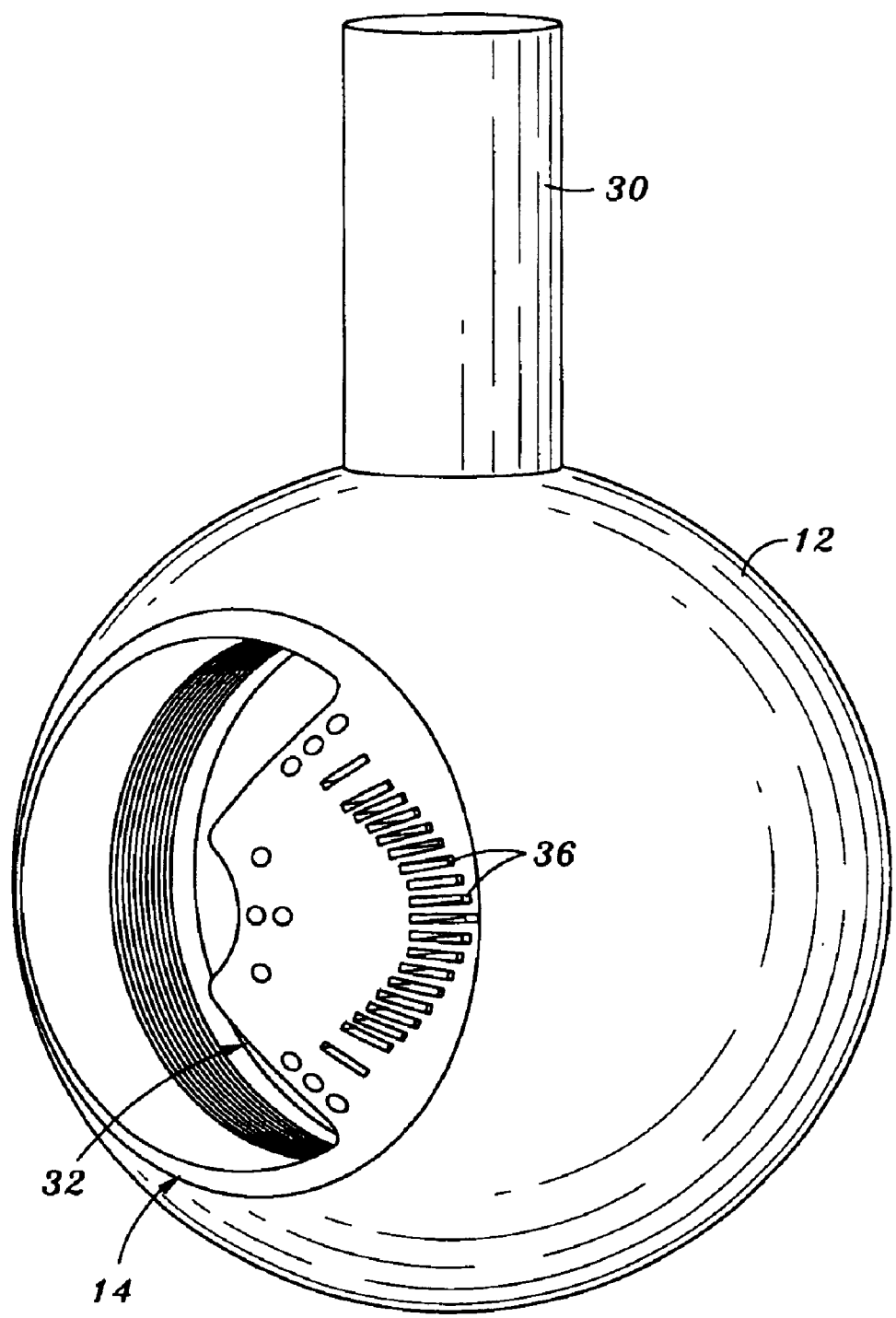
FIG. 2 is a front perspective view of the closure element and impedance assembly of the first embodiment shown in FIG. 1.
Figure 3:
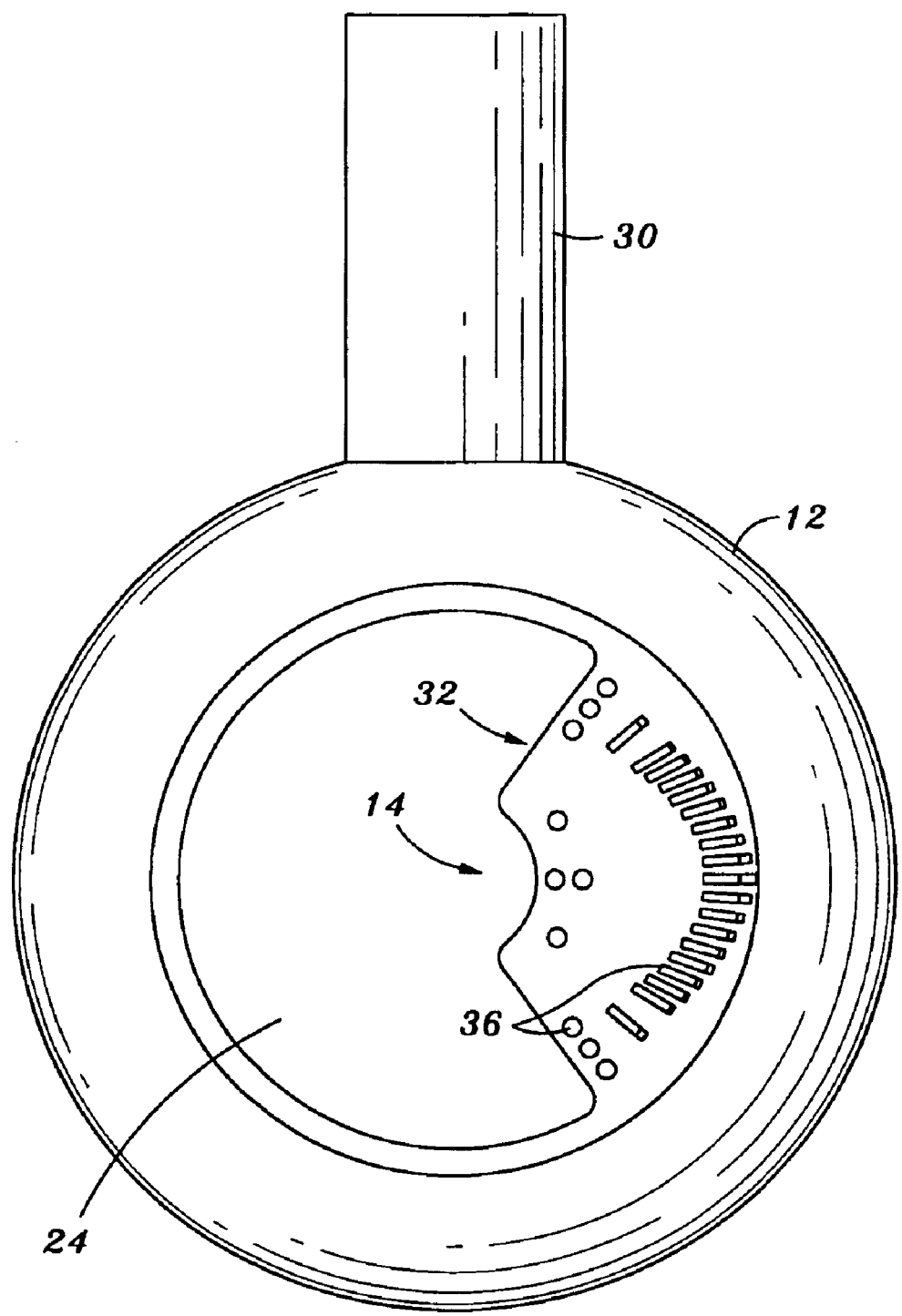
FIG. 3 is a front elevational view of the closure element and impedance assembly shown in FIG. 2.

The impedance assembly 14 comprises a cylindrically configured main feeder cap 32 which, in a preliminary, un-machined state, defines a generally planar outer surface 34 and an opposed, generally planar inner surface. Disposed within the main feeder cap 32 are a plurality of main feeder passages 36 which extend therethrough. The main feeder passages 36 are segregated into various sets, with one set of the main feeder passages 36 having elongate, slot-like configurations and being arranged in an arcuate pattern, and other sets of the main feeder passages 38 each having generally circular configurations. As seen in FIGS. 2 and 3, two sets of the circularly configured main feeder passages 36 are disposed at respective ones of the opposed ends of the arcuate set of elongate main feeder passages 36. Also disposed within the main feeder cap 32 is an enlarged opening 37.

Figure 7:
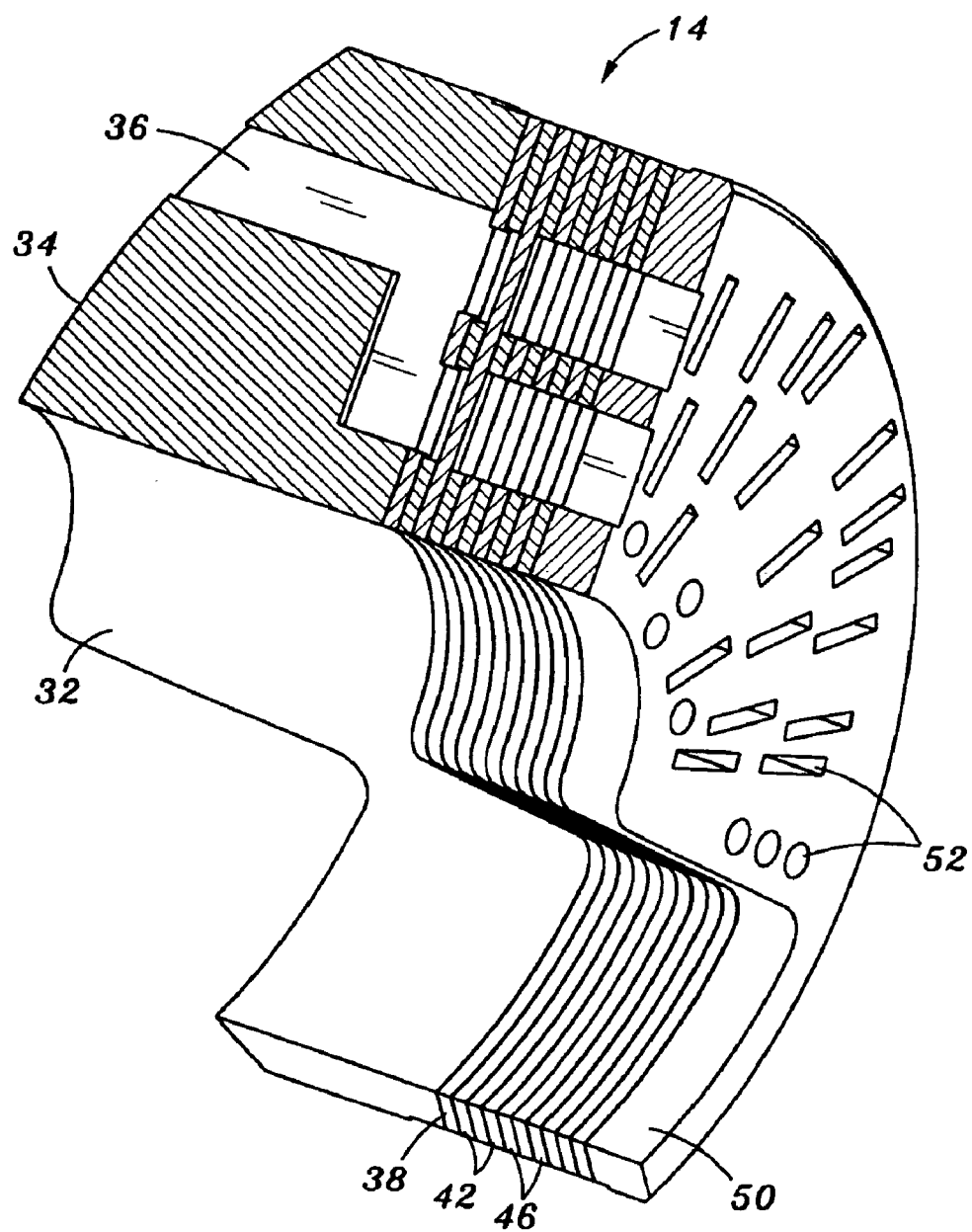
FIG. 7 is a cross-sectional view of the impedance assembly of the first embodiment.
Figure 8:
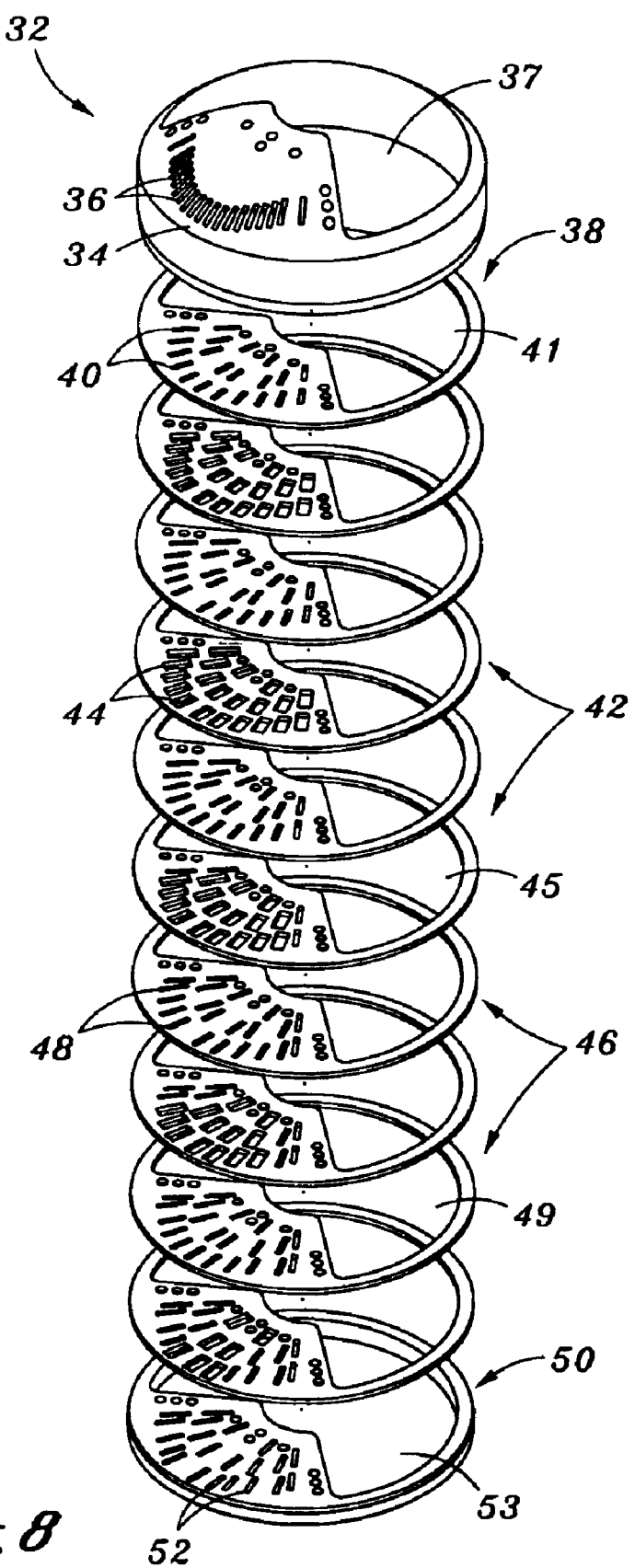
FIG. 8 is an exploded view of the impedance assembly of the first embodiment.
Figure 11:
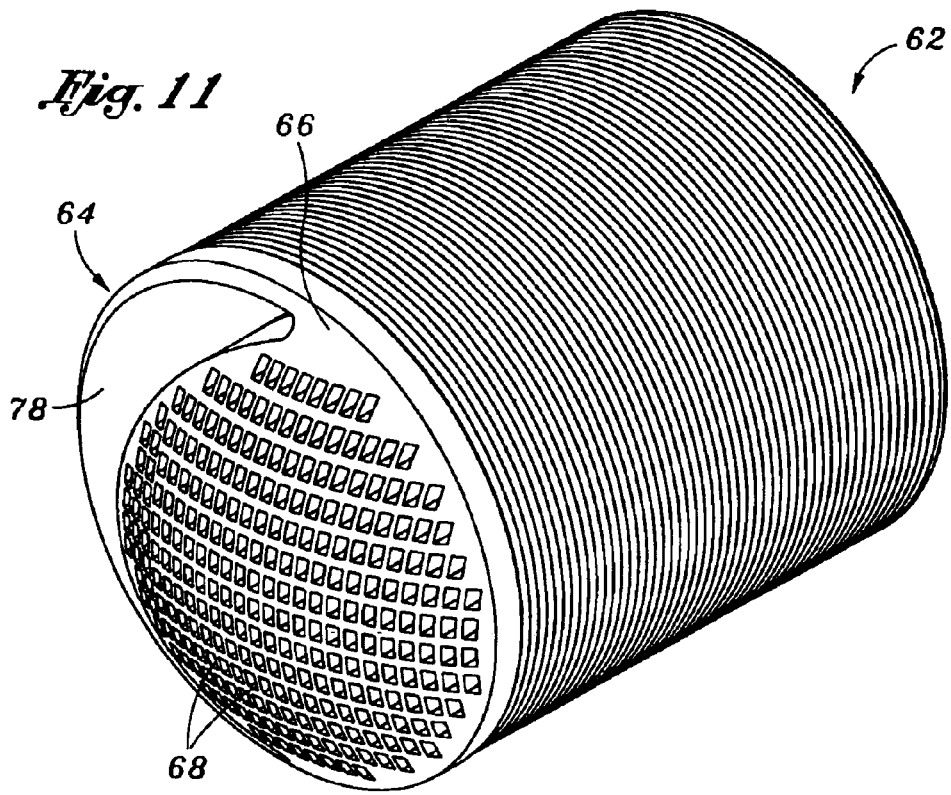
FIG. 11 is a front perspective view of the impedance assembly of the second embodiment.
Figure 12:
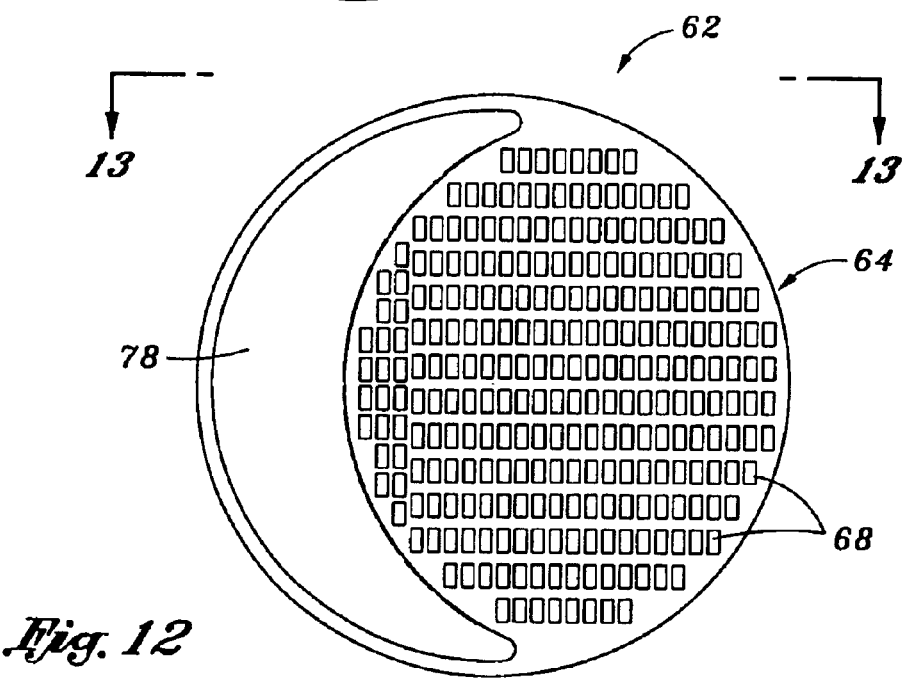
FIG. 12 is a front elevational view of the impedance assembly of the second embodiment.

As best seen in FIGS. 7 and 8, in addition to the main feeder cap 32, the impedance assembly 14 includes a secondary feeder cap 38 which has a circular, plate-like configuration and is abutted against the inner surface of the main feeder cap 32. Disposed within the feeder cap 38 are a plurality of feeder cap passages 40 and an opening 41 which has the same general profile or shape as the opening 37 of the main feeder cap 32. The impedance assembly 14 further comprises a plurality of circularly configured expansion plates 42, each of which includes a plurality of expansion passages 44 formed therein. In addition to the expansion passages 44, each expansion plate 42 includes an opening 45 disposed therein which has the same general shape or profile as the above-described openings 37, 41. Also included in the impedance assembly 14 are a plurality of circularly configured spacer plates 46 which are interleaved between respective pairs of the expansion plates 42 and each include a plurality of spacer passages 48 therein. In addition to the spacer passages 48, each expansion plate 42 includes an opening 49 disposed therein which has the same general shape or profile as the openings 37, 41, 45. Finally, the impedance assembly 14 includes a circularly configured exit plate 50 which itself includes a plurality of exit passages 52 disposed therein. The exit plate 50 also includes an opening 53 disposed therein which has the same general shape or profile as the openings 37, 41, 45, 49.

In the impedance assembly 14, the main feeder cap 32, feeder cap 38, and expansion, spacer and exit plates 42, 46, 50 are assembled in a stacked arrangement, and are preferably of equal outer diameters. As indicated above, the feeder cap 38 is abutted against the inner surface of the main feeder cap 36, with the expansion and spacer plates 42, 46 being stacked in succession upon the feeder cap 38. The uppermost expansion plate 42 is abutted against that surface of the feeder cap 38 opposite that abutted against the inner surface of the main feeder cap 32. The exit plate 50 is abutted against the lowermost expansion plate 42. The main feeder cap 32, feeder cap 38, and expansion, spacer and exit plates 42, 46, 50 are preferably maintained in a stacked arrangement via brazed connections, though other attachment methods may be employed as an alternative.

When the impedance assembly 14 is initially assembled, the main feeder cap 32, feeder cap 38, and expansion, spacer and exit plates 42, 46, 50 are stacked upon each other such that the main feeder passages 36, feeder cap passages 40, expansion passages 44, spacer passages 48, and exit passages 52 are oriented relative to each other in a manner collectively defining a plurality of tortuous passageways 54 and a plurality of generally straight passageways 56 which each extend through the impedance assembly 14. Similar to the main feeder passages 36, the feeder cap passages 40 of the feeder cap 48 include those which have an elongate, slot-like configuration and are arranged in arcuate patterns, and those which have a generally circular configuration. The expansion passages 44 of each of the expansion plates 42, the spacer passages 48 of each of the spacer plates 46, and the exit passages 52 of the exit plate 50 are also provided in both elongate and circular configurations.

In the impedance assembly 14, the main feeder cap 32, feeder cap 38, and expansion, spacer and exit plates 42, 46, 50 are stacked upon each other such that the circularly configured passages thereof are disposed in coaxially aligned sets. Each coaxially aligned set of circularly configured passages collectively define a respective one of the straight passageways 56 of the impedance assembly 14. The elongate passages of the main feeder cap 32, feeder cap 38, and expansion, spacer and exit plates 42, 46, 50 are also arranged in sets wherein the passages of each set are only partially aligned with each other (i.e., only partially overlap) such that each set of the partially aligned elongate passages collectively define a respective one of the tortuous passageways 54.

Figure 6:
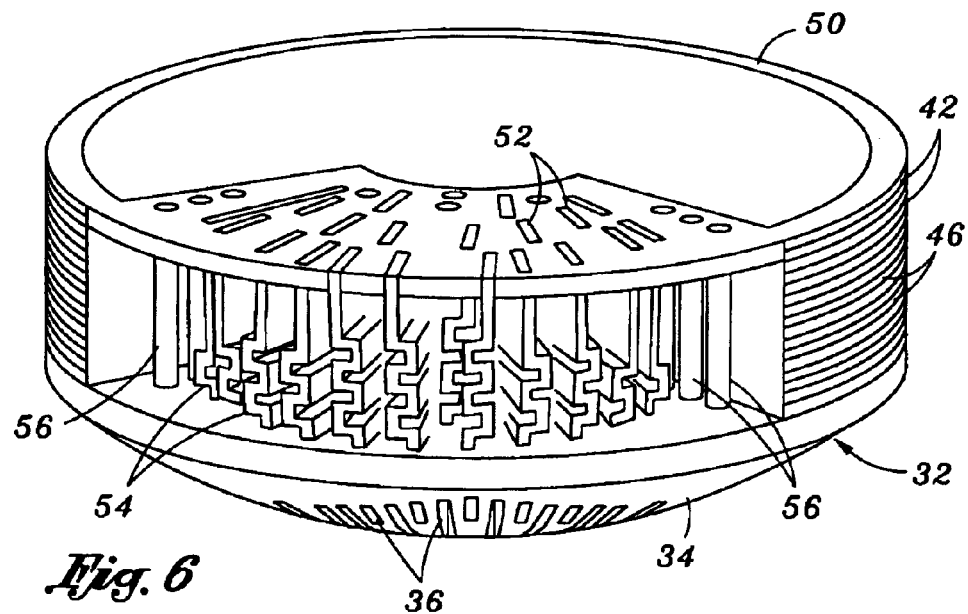
FIG. 6 is a cutaway view of the impedance assembly of the first embodiment illustrating the tortuous flow passageways defined thereby.

As seen in FIG. 6, the tortuous passageways 54 of the impedance assembly 14 are not formed to provide uniform noise or energy attenuation characteristics. In this regard, those tortuous passageways 54 partially defined by the main feeder passages 36 disposed in the approximate center of the arcuate arrangement thereof provide the highest level of energy attenuation capability (i.e., define the greatest number of turns). The noise or energy attenuating capabilities of the remaining tortuous passageways 54 progressively decrease (i.e., the number of turns defined by the passageways 54 is reduced) as they approach respective ones of the opposed ends of the arcuate arrangement of main feeder passages 36. As such, those tortuous passageways 54 disposed closest to each of the sets of circular main feeder passages 36 at the opposed ends of the elongate main feeder passages 36 define the least number of turns, and hence provide a level of energy attenuation exceeding only that of the straight passageways 56.

As is further seen in FIG. 8, when the impedance assembly 14 is initially assembled, the openings 37, 41, 45, 49 and 53 are also aligned with each other and collectively define a flow opening 58 which extends through the impedance assembly 14. The remaining portions of the main feeder cap 32, feeder cap 38, and expansion, spacer and exit plates 42, 46, 50 collectively define an annular outer wall of the impedance assembly 14 and a circumferential section which spans in the range of from about ninety degrees to about one hundred twenty degrees and includes each of the tortuous passageways 54 and straight passageways 56 extending therethrough. As such, the flow opening 58 collectively defined by the openings 37, 41, 45, 49, 53 spans in the range from about 240 degrees to about 270 degrees. Prior to the assembly of the impedance assembly 14, the outer surface 34 of the main feeder cap 32 is machined so as to provide the same with an arcuate, generally convex configuration. The pre-machining thickness of the main feeder cap 32 allows for the completion of this machining operation.

Referring now to FIGS. 2–4, upon the fabrication of the impedance assembly 14, the same is advanced into the bore 24 of the closure element 12. It is contemplated that the impedance assembly 14 may be "shrink-fit" into the closure element 12. However, those of ordinary skill in the art will recognize that alternative attachment methods may be employed to facilitate the interface of the impedance assembly 14 to the closure element 12. In any such attachment method, it is preferred that the inner surface of the closure element 12 defining the bore 24 thereof be formed to include an annular shoulder 60 which serves as an abutment or stop surface for the impedance assembly 14. In this regard, the shoulder 60 is oriented such that the abutment of the exit plate 50 thereagainst causes the arcuate outer surface 34 of the main feeder cap 32 to extend in a flush or continuous relationship with the outer surface of the closure element 12 at the inflow end 26 of the bore 24. In this regard, it is contemplated that the outer surface 34 of the main feeder cap 32 will be machined such that the contour is complementary to that of the outer surface of the closure element 12.

Due to the configuration of the impedance assembly 14, the number of tortuous and straight passageways 54, 56 exposed to flow along the axis of the flow path 18 varies as the closure element 12 is rotated from its fully closed position toward its fully open position. In this regard, when the closure element 12 is initially cracked open, fluid will flow only into those tortuous passageways 54 imparting the highest level of energy attenuation, i.e., only those tortuous passageways 54 partially defined by the main feeder passages 36 disposed in the approximate center of the arcuate arrangement thereof are exposed to the fluid flow. As the opening of the closure element 12 progresses, the remaining tortuous passageways 54 of lesser energy attenuating capability are progressively exposed to the fluid flow. Thus, the number of tortuous passageways 54 exposed to fluid flow progressively increases as the closure element 12 is rotated toward its fully open position. Due to their orientations relative to the tortuous passageways 54, the straight passageways 56 are exposed to fluid flow once flow has commenced through virtually all of the tortuous passageways 54. The continued rotation of the closure element 12 toward its fully open position then allows fluid to flow through the flow opening 58 defined by the impedance assembly 14 in an unrestricted manner. When the closure element 12 is ultimately rotated to its fully open position, a portion of the fluid flow continues to flow through the tortuous and straight passageways 54, 56, with the majority of the fluid flow passing through the flow opening 58. Thus, the impedance assembly 14 provides the benefits of those utilized in linear valve arrangements, yet imparts those benefits to the rotary closure element 12 of the valve 10.

Referring now to FIGS. 9–14, there is shown an impedance assembly 62 which is constructed in accordance with a second embodiment of the present invention. Like the impedance assembly 14 of the first embodiment described above, the impedance assembly 62 is carried by the closure element 12, and more particularly is operatively positioned within the bore 24 in a manner which will be described in more detail below. The structural attributes of the impedance assembly 62 also allow the same to be retrofitted to the closure element 12 of an existing valve 10, or provided as an original component thereof.

The impedance assembly 62 comprises a feeder cap 64 which is machined so as to define an arcuate, convex outer surface 66. Disposed within the feeder cap 64 are a plurality of feeder passages 68 which extend therethrough. Each of the feeder passages 68 has a generally rectangular cross-sectional configuration, though those of ordinary skill in the art will recognize that the present invention is not intended to be limited to any particular shape for the feeder passages 68. Also disposed within the feeder cap 64 is a generally crescent-shaped opening 70.

As best seen in FIG. 13, in addition to the feeder cap 64, the impedance assembly 62 includes a plurality of circularly configured impedance plates 72. The impedance plates 72 each include a plurality of impedance passages formed therein. In addition to the impedance passages, each of the impedance plates 72 includes an opening formed therein which has the same general shape or profile of the opening 70 formed within the feeder cap 64. The impedance plates 72 are stacked upon each other, with an upper most one of the impedance plates 72 being abutted against the inner surface of the feeder cap 64. In addition to the feeder cap 64 and impedance plates 72, the impedance assembly 62 includes a circularly configured exit plate 74 which itself includes a plurality of exit passages disposed therein. In addition to the exit passages, the exit plate 74 includes an opening disposed therein which has the same general shape or profile as the opening 70 of the feeder cap 64 and the opening within each of the impedance plates 72.

In the impedance assembly 62, the feeder cap 64, impedance plates 72 and exit plate 74 are assembled in a stacked arrangement, and are preferably of equal outer diameters. As indicated above, the upper most impedance plate 72 within the stack is abutted against the inner surface of the feeder cap 64, with the impedance plates 72 being stacked in succession upon the feeder cap 64. The exit plate 74 is abutted against the lower most impedance plate 72. The feeder cap 64, impedance plates 72 and exit plate 74 are preferably maintained in a stacked arrangement via brazed connections, though other attachment methods may be employed as an alternative.

When the impedance assembly 62 is initially assembled, the feeder cap 64 and impedance and exit plates 72, 74 are stacked upon each other such that the feeder passages 68, impedance passages and exit passages are oriented relative to each other in a manner collectively defining a plurality of tortuous passageways 76 which are best shown in FIG. 14. As is apparent from FIG. 14, some of the tortuous passageways 76 extend longitudinally through the entire length of the impedance assembly 62 (i.e., terminate at the exit plate 74), with some of the tortuous passageways 76 terminating at a side surface collectively defined by the peripheral edges of the impedance plates 72. When the feeder cap 64 and impedance and exit plates 72, 74 are stacked upon each other, the feeder passages 68, impedance passages, and exit passages are arranged in sets wherein certain passages of each set are coaxially aligned with each other in a longitudinal direction, with other passages of the same set being laterally or radially aligned with each other, or only partially aligned in a longitudinal or lateral direction (i.e., only partially overlapping) such that each set of the passages collectively define a respective one of the tortuous passageways 76.

In addition to the feeder passages 68, impedance passages and exit passages being aligned in sets to collectively define the tortuous passageways 76, the opening 70 within the feeder cap 64 and openings within the impedance plates 72 and exit plate 74 are also aligned so as to collective define a flow opening 78 which extends longitudinally through the impedance assembly 62. As is further seen in FIG. 14, the tortuous passageways 76 of the impedance assembly 62 are not formed to provide uniform noise or energy attenuation characteristics. In this regard, those tortuous passageways 76 disposed furthest from the flow opening 78 are configured to provide the highest level of energy attenuation capability (i.e., define the greatest number of turns). The noise or energy attenuating capabilities of the remaining tortuous passageways 76 progressively decrease (i.e., the number of turns defined by the passageways 76 is reduced) as they approach the flow opening 78. Those tortuous passageways 76 having the highest energy attenuating capabilities (defining the greatest number of turns) each terminate at the exit plate 74. Those tortuous passageways 76 of lesser energy attenuation capability terminate at the side surface collectively defined by the impedance plates 72, and hence facilitate outflow directly into the flow opening 78.

Upon the fabrication of the impedance assembly 62, the same is advanced into the bore 24 of the closure element 12. It is contemplated that the impedance assembly 62 may be "shrink-fit" into the closure element 12. However, those of ordinary skill in the art will recognize that alternative attachment methods may be employed to facilitate the interface of the impedance assembly 62 to the closure element 12. When the impedance assembly 62 is properly interfaced to the closure element 12, the arcuate outer surface 66 of the feeder cap 64 will extend in a flush or continuous relationship with the outer surface of the closure element 12 at the inflow end 26 of the bore 24. In this regard, it is contemplated that the outer surface 66 of the feeder cap 64 will be machined such that its contour is complimentary to that of the outer surface of the closure element 12.

Due to the configuration of the impedance assembly 62, the number of tortuous passageways 76 exposed to flow along the axis of the flow path 18 varies as the closure element 12 is rotated from its fully closed position toward its fully open position. In this regard, when the closure element 12 is initially cracked open, fluid will flow only into those tortuous passageways 76 imparting the highest level of energy attenuation. As the opening of the closure element 12 progresses, the remaining tortuous passageways 76 of lesser energy attenuating capability are progressively exposed to the fluid flow. Thus, the number of tortuous passageways 76 exposed to fluid flow progressively increases as the closure element 12 is rotated toward its fully open position. The continued rotation of the closure element 12 toward its fully open position then allows fluid to flow through the flow opening 78 defined by the impedance assembly 62 in an unrestricted manner. When the closure element 12 is ultimately rotated to its fully open position, a portion of the fluid flow continues to flow through the tortuous passageways 76, with fluid flow also passing through the flow opening 78. Thus, like the impedance assembly 14 described above, the impedance assembly 64 of the second embodiment provides the benefits of those utilized in linear valve arrangements, yet imparts those benefits to the rotary closure element 12 of the valve 10.

Referring now to FIGS. 15–23, there is shown an impedance assembly 80 constructed in accordance with a third embodiment of the present invention. Like the impedance assemblies 14, 62 of the first and second embodiments described above, the impedance assembly 80 of the third embodiment is carried by the closure element 12, and more particularly is operatively positioned within the bore 24 in a manner which will be described in more detail below. The structural attributes of the impedance assembly 80 also allow the same to be retrofitted to the closure element 12 of an existing valve 10, or provided as an original component thereof.

Figure 20:
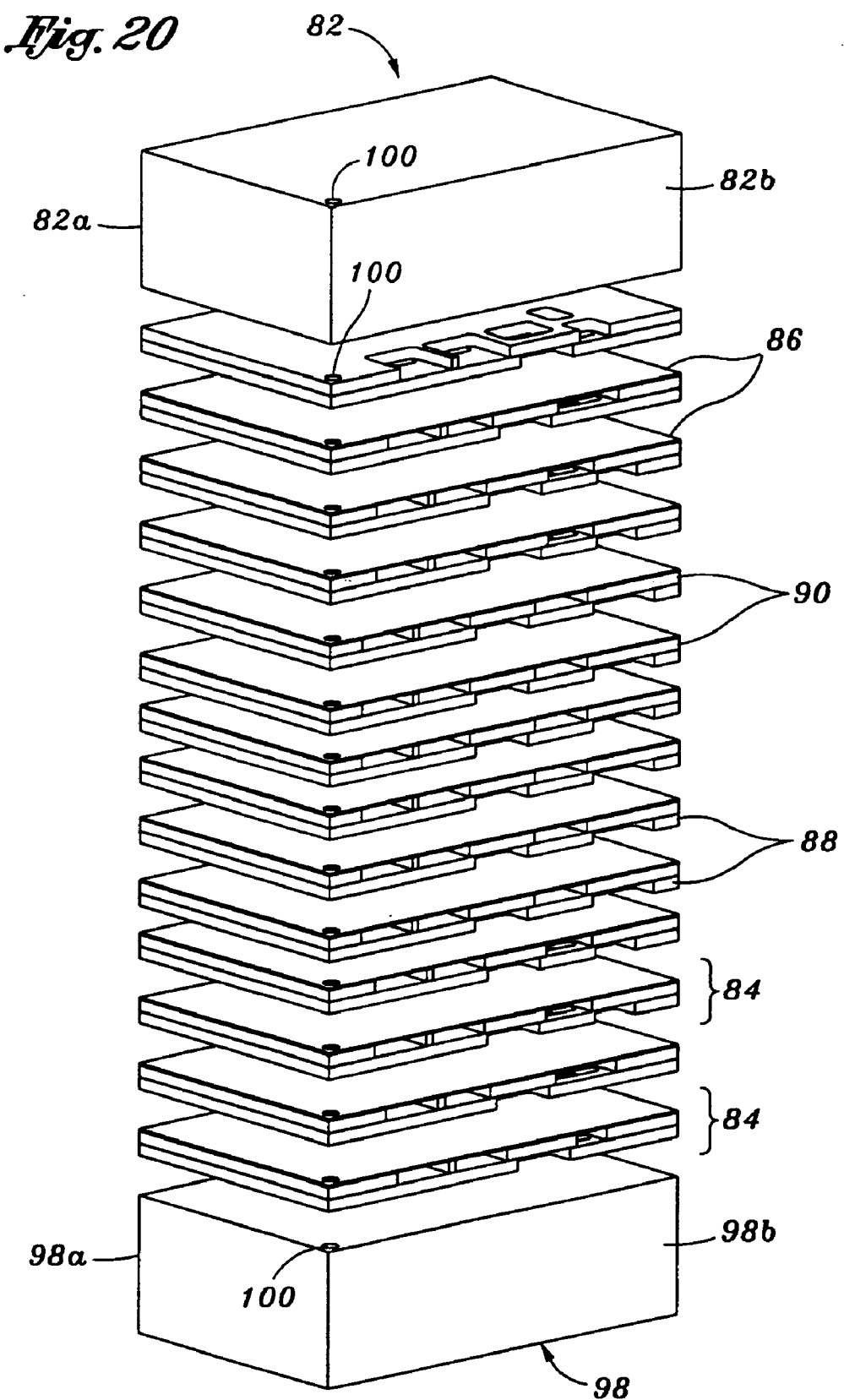
FIG. 20 is an exploded view of the impedance assembly of the third embodiment in a pre-machined configuration.
Figure 21:
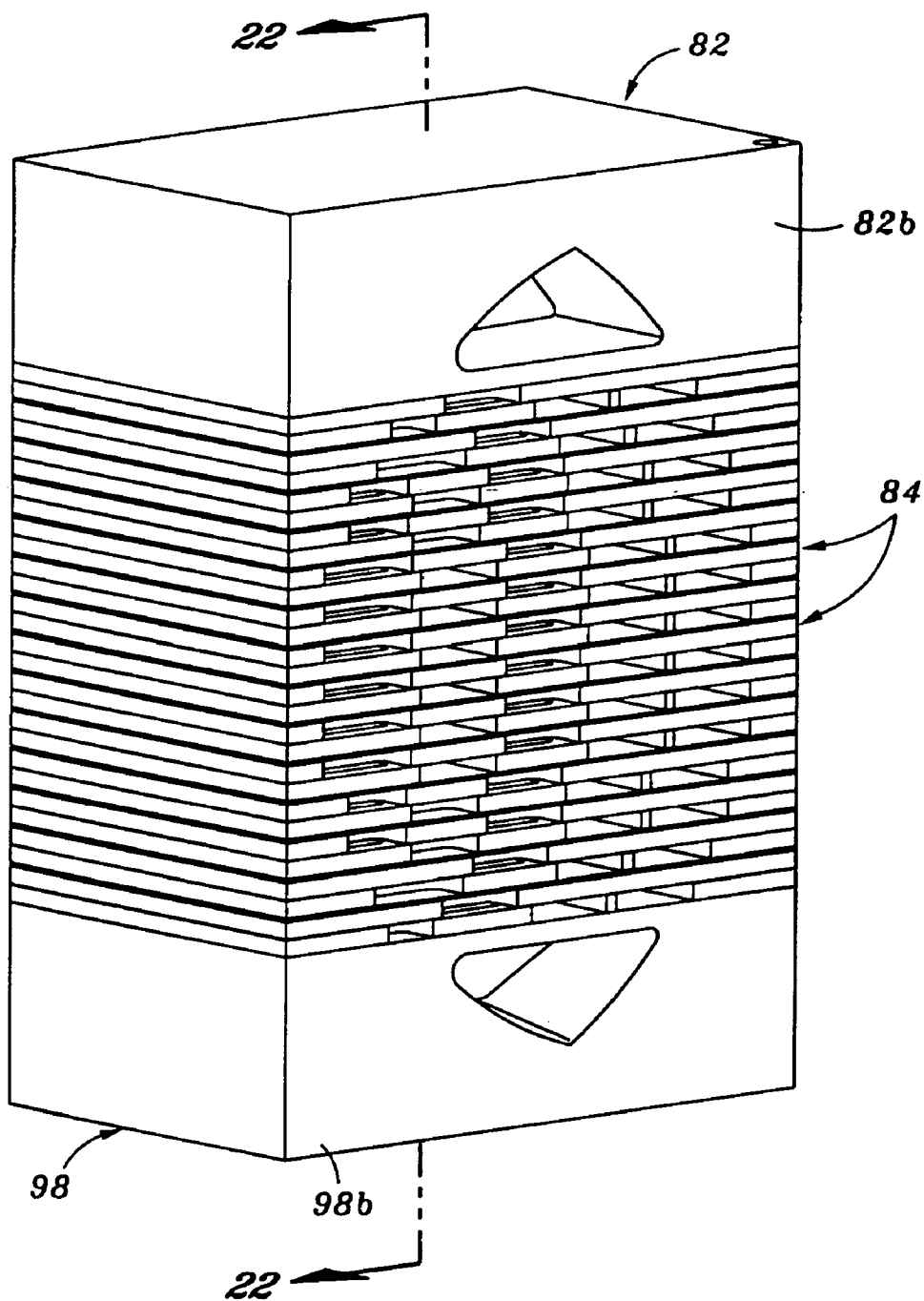
FIG. 21 is a rear perspective view of the impedance assembly of the third embodiment in a partially machined configuration.
Figure 22:
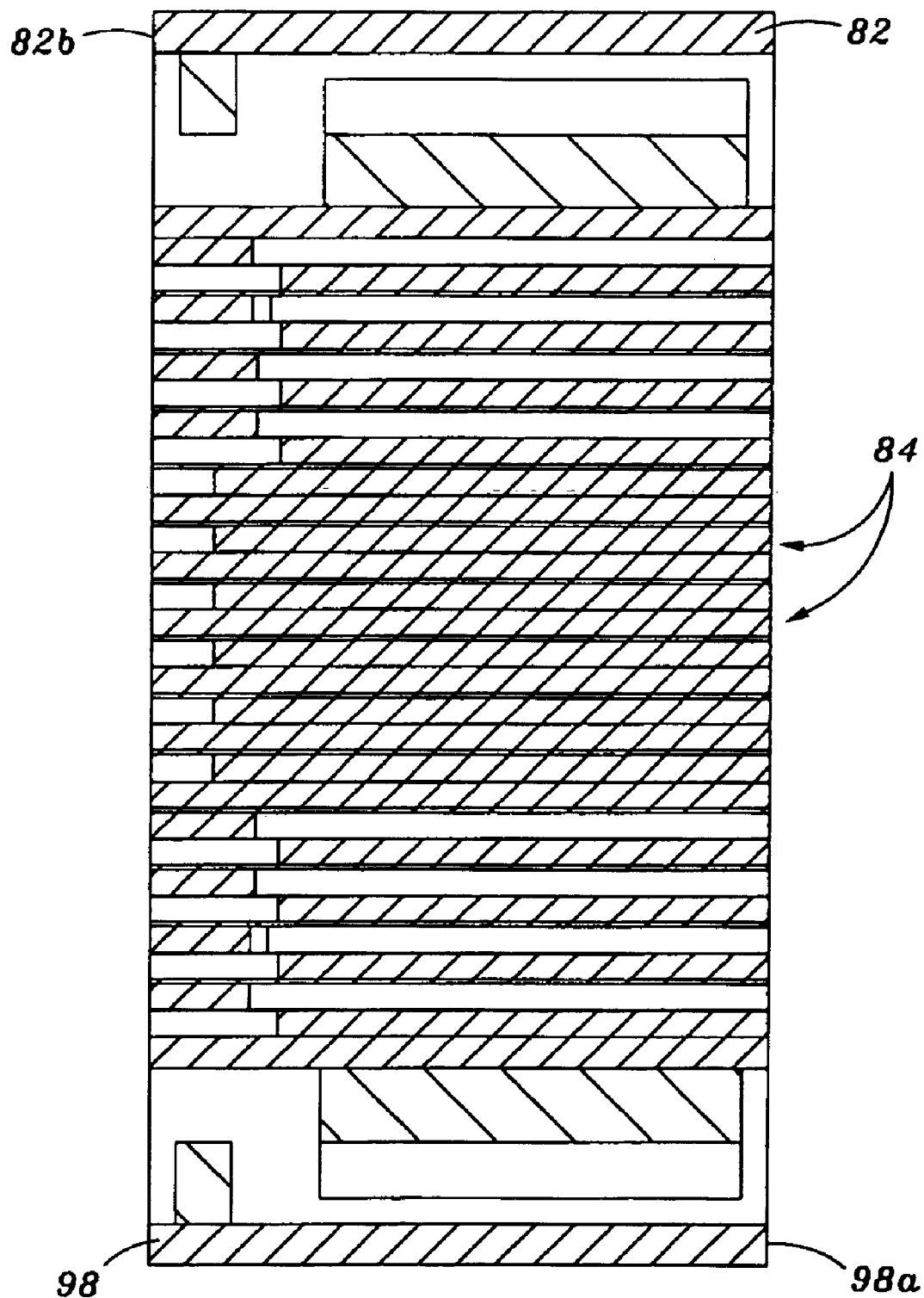
FIG. 22 is a cross-sectional view taken along line 22—22 of FIG. 21.
Figure 23:
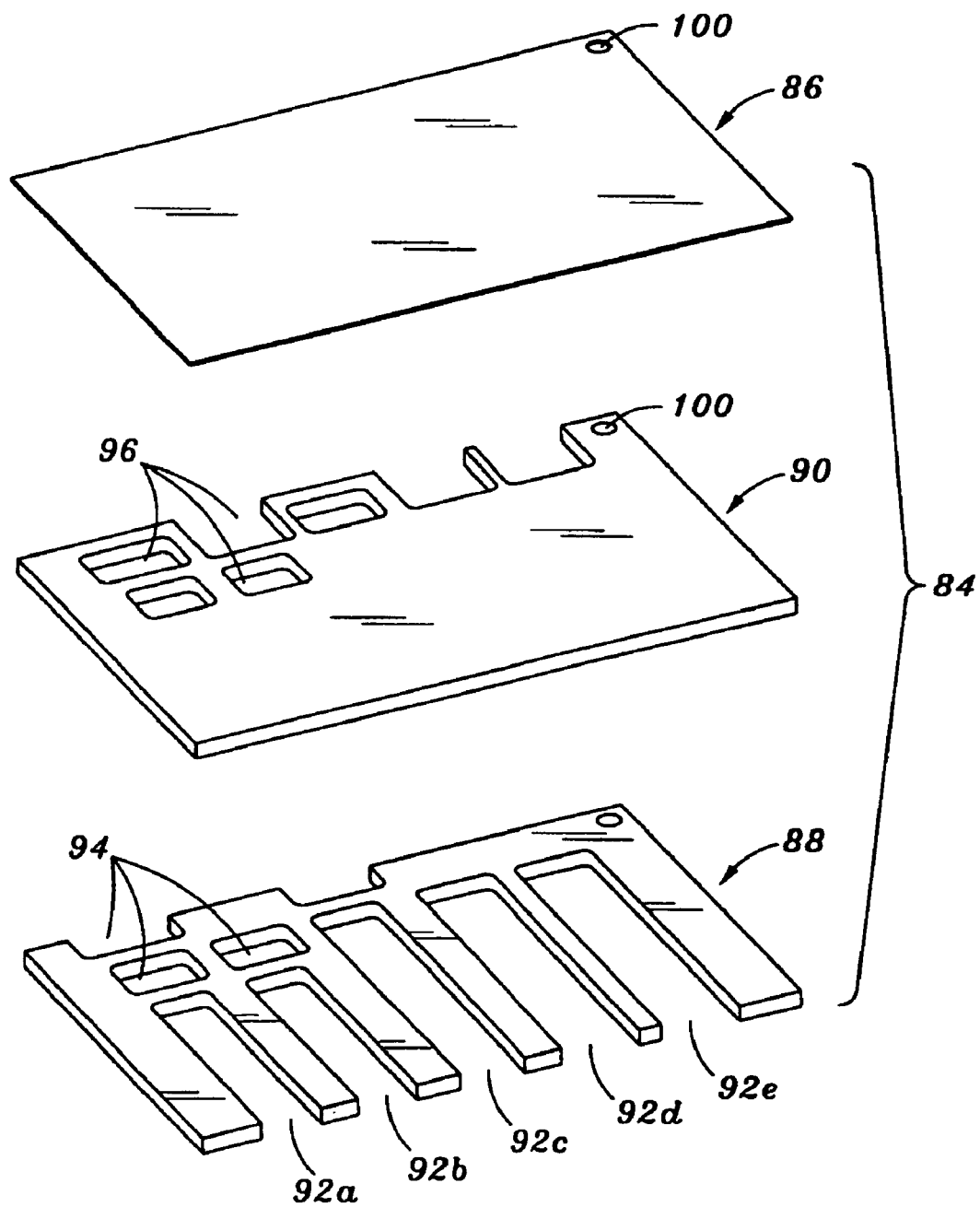
FIG. 23 is an exploded view of one of the disk assemblies of the impedance assembly of the third embodiment in a pre-machined configuration.

Referring now to FIGS. 20–22, the impedance assembly 80 comprises an upper cap 82 which, in a preliminary, un-machined state, has a generally rectangular configuration defining an inlet side surface 82a and an outlet side surface 82b. In this regard, the inlet and outlet side surfaces 82a, 82b are defined by respective ones of the longitudinal sides of the rectangularly configured upper cap 82. In addition to the upper cap 82, the impedance assembly 80 includes a plurality of impedance plate assemblies 84 which are maintained in a stacked arrangement, and are best shown in FIGS. 20 and 23. Each impedance plate assembly 84 comprises a rectangularly configured separator plate 86, a rectangularly configured first impedance plate 88, and a rectangularly configured second impedance plate 90. Formed within the first impedance plate 88 are a plurality of elongate slots labeled 92a–92e, respectively. Also formed within the first impedance plate 88 adjacent the inner ends of the slots 92a–92c are various openings 94, some of which are formed within one of the longitudinal peripheral edge segments of the first impedance plate 88. Similarly, formed within the second impedance plate 90 are a plurality of openings 96, some of which also are formed within one of the longitudinal peripheral edge segments of the second impedance plate 90.

Within each impedance plate assembly 84, the separator plate 86, first impedance plate 88, and second impedance plate 90 are maintained in a stacked arrangement. In this regard, the length and width dimensions of the separator plate 86, first impedance plate 88 and second impedance plate 90 are preferably substantially equal, such that the longitudinal and lateral peripheral edge segments thereof are substantially flush when the plates 86, 88, 90 are stacked. The stacking is completed such that the openings 96 of the second impedance plate 90 partially overlap corresponding openings 94 and slots 92a–e of the first impedance plate 88. The separator plate 86 is attached to one side or face of the second impedance plate 90 such that the second impedance plate 90 is disposed or sandwiched between the separator plate 86 and the first impedance plate 88.

As is further seen in FIG. 20, within the impedance assembly 80, the impedance plate assemblies 84 are stacked upon the upper cap 82. The uppermost impedance plate assembly 84 of the impedance assembly 80 does not include the separator plate 86, with the second impedance plate 90 thereof being abutted directly against the bottom surface of the upper cap 82. For each successively stacked impedance plate assembly 84, the separator plate 86 of each such impedance plate assembly 84 is abutted against the first impedance plate 88 of the impedance plate assembly 84 immediately above it.

In addition to the upper cap 82 and impedance plate assemblies 84, the impedance assembly 80 includes a lower cap 90 which, like the upper cap 82, has a generally rectangular configuration in its preliminary, un-machined state, and defines an inlet side surface 98a and an outlet side surface 98b. In the impedance assembly 80, the top surface of the lower cap 98 is abutted against the first impedance plate 88 of the lowermost impedance plate assembly 84. As seen in FIGS. 20–22, the length and width dimensions of the upper and lower caps 82, 98 are also substantially equal to those of the plates 86, 88, 90, with the longitudinal and lateral sides of the upper and lower caps 82, 98 being substantially flush with the longitudinal and lateral peripheral edge segments of the plates 86, 88, 90, i.e., the inlet side surfaces 82a, 98a and outlet side surfaces 82b, 98b are substantially flush or continuous with respective ones of the longitudinal peripheral edge segments of the plates 86, 88, 90.

As is seen in FIGS. 20 and 23, the upper and lower caps 82, 98 and plates 86, 88, 90 each preferably include an alignment or registry aperture 100 disposed within a corner region thereof. The alignment apertures 100 are included in prescribed corner regions of the upper and lower caps 82, 98 and plates 86, 88, 90, and are adapted to facilitate a proper registry between such components in the stacking thereof. In this regard, the apertures 100 are brought into coaxial alignment with each other, and are adapted to receive a retention pin which, when advanced thereinto, assists in maintaining the upper and lower caps 82, 98 and plates 86, 88, 90 in a proper, stacked registry.

In the impedance assembly 80, the stacking of the upper cap 82, impedance plate assemblies 84, and lower cap 98 occurs in a manner wherein the slots 92a–e terminate at the longitudinal peripheral edge segment of the first impedance plate 88 which extends along the inlet side surfaces 82a, 98a of the upper and lower caps 82, 98, and the openings 94, 96 are disposed adjacent to or formed within the longitudinal peripheral edge segments of the first and second impedance plates 88, 90 which extend along the outlet side surfaces 82b, 98b of the upper and lower caps 82, 98. In FIGS. 20 and 21, the impedance assemblies 84 are viewed from the rear perspective, and are shown from a front perspective in FIG. 23. The exploded view from the front perspective in FIG. 23 demonstrates that each impedance assembly 84 defines a plurality of tortuous passageways which extend between the longitudinal peripheral edge segments of the plates 86, 88, 90 in spaced relation to each other.

Due to the arrangement of the openings 94, 96 within the first and second impedance plates 88, 90, the tortuous passageway partially defined by the slot 92*a* includes a total of eight turns, with the tortuous passageway partially defined by the slot 92*b* defining a total of six turns, the tortuous passageway partially defined by the slot 92*c* defining a total of four turns, and the tortuous passageways partially defined by the slots 92*d*, 92*e* each defining a total of two turns. Thus, the number of turns defined by the tortuous passageways decreases as the passageways progress from left to right viewed from the front perspective shown in FIG. 23. Those of ordinary skill in the art will recognize that the number of turns defined by the tortuous passageways as described above is exemplary only, and that slots and openings may be formed in the impedance plates 88, 90 as needed to effectuate the implementation of differing numbers of turns. Moreover, as is seen in FIGS. 20 and 21, the distance separating the slots 92*a–e* and openings 94, 96 from each other and from the lateral peripheral edge segments of respective ones of the first and second impedance plates 88, 90 is not perfectly uniform within all of the impedance plate assemblies 84. Rather, these separation distances are varied as needed to arrange the tortuous passageways in sets wherein the tortuous passageways of each set define equal numbers of turns but extend in a generally arcuate pattern.

Figure 19:
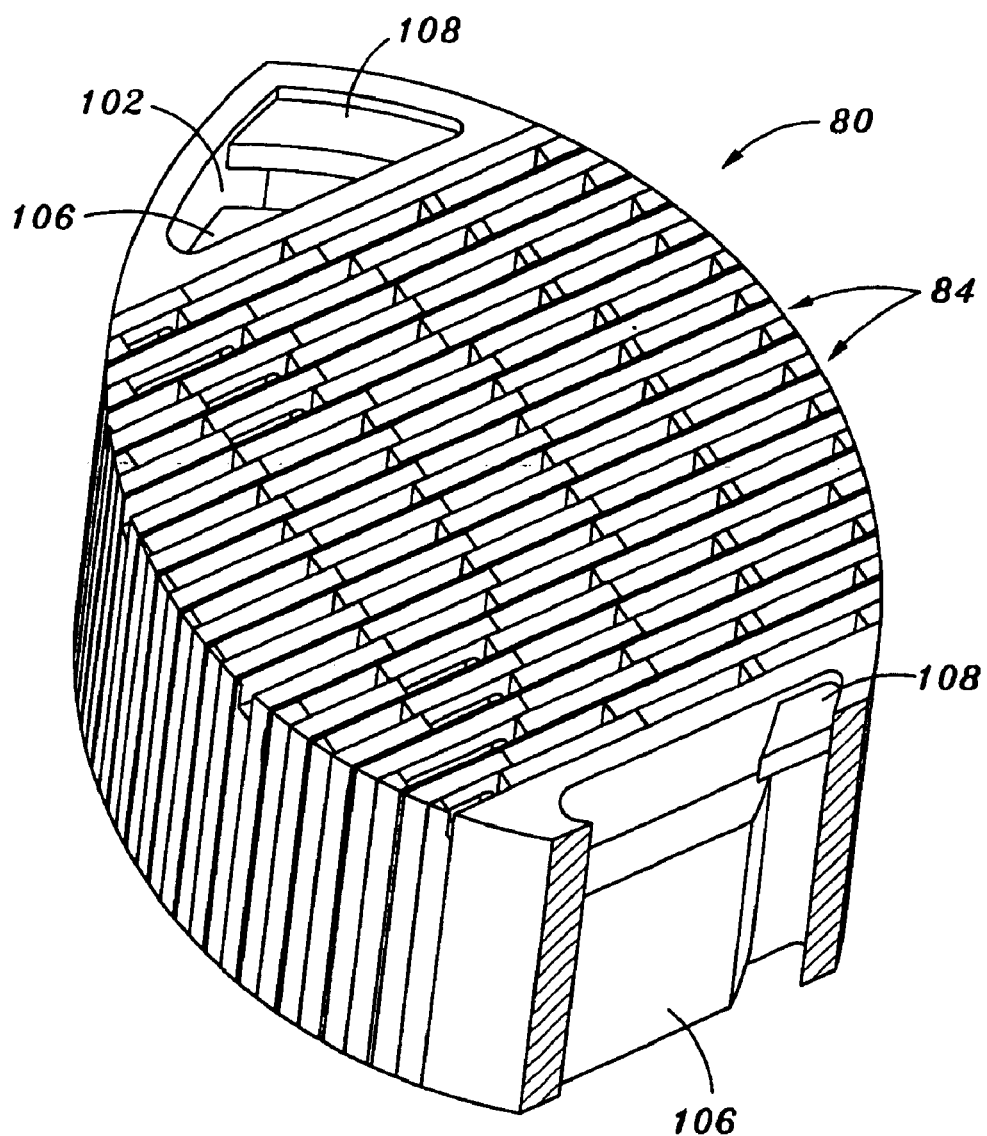
FIG. 19 is a cut-away perspective view of the impedance assembly of the third embodiment illustrating the internal configuration of one of the flow openings thereof.

In the impedance assembly 80 of the third embodiment, the impedance plate assemblies 84 and upper and lower caps 82, 98 are preferably maintained in their stacked arrangement via brazed connections, though other attachment methods may be employed as an alternative. Upon the stacking of the upper and lower caps 82, 98 and impedance plate assemblies 84 in the above-described manner, a top flow opening 102 is formed into the upper cap 82 and extends between the inlet and outlet side surfaces 82*a*, 82*b* thereof. Similarly, a bottom flow opening 104 is formed into the lower cap 98 and extends between the inlet and outlet side surfaces 98*a*, 98*b* thereof. The top and bottom flow openings 102, 104 may each be formed within respective ones of the upper and lower caps 82, 98 via a wire EDM process. As seen in FIG. 19, preferably disposed within the top flow opening 102 is a first plate 106 and a second plate 108 which are each attached (e.g., welded) to the upper cap 82. The first plate 106 and second plate 108 are arranged within the top flow opening 102 relative to each other such that the top flow opening 102 does not define a straight flow path, but rather defines a tortuous flow path defining two turns. Those of ordinary skill in the art will recognize that differing numbers of plates may be disposed within the top flow opening 102 in differing arrangements as needed to facilitate the creation of differing numbers of turns, or that no plates at all need be included within the top flow opening 102. In the impedance assembly 80, the first and second plates 106, 108 are also disposed within the bottom flow opening 104 in the same arrangement shown in FIG. 19A so as to define a tortuous passageway having two turns therein. It will further be recognized that the top and bottom flow openings 102, 104 may each have a shape differing from that shown in the figures (e.g., tear drop, round, triangular, etc.) to give the trim a specific flow curve characteristic.

Figure 17:
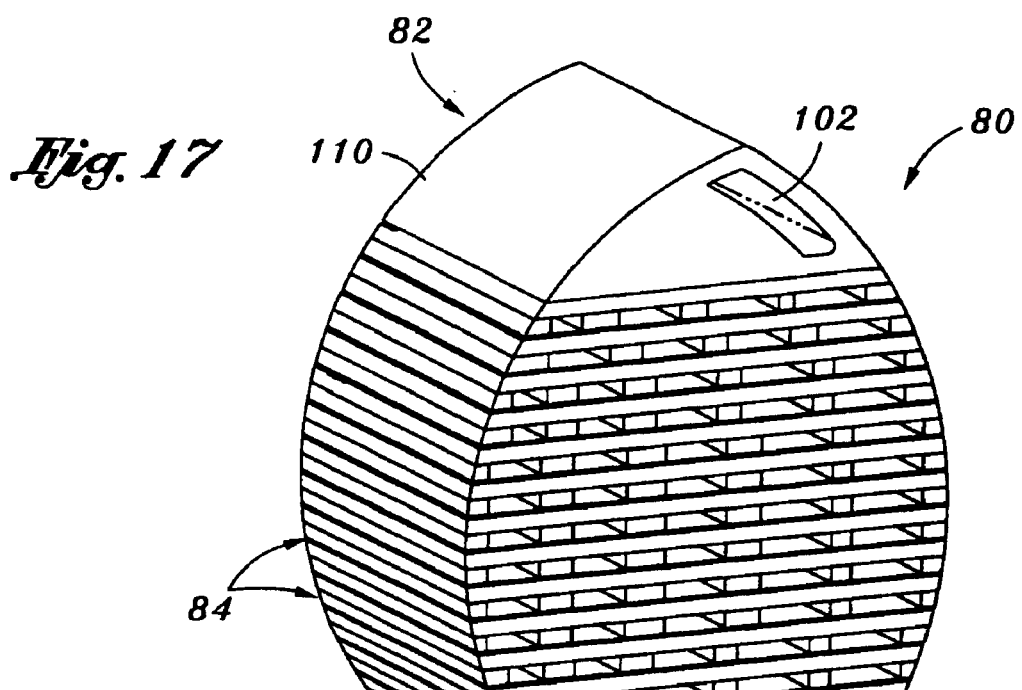
FIG. 17 is a front perspective view of the impedance assembly of the third embodiment.
Figure 18:
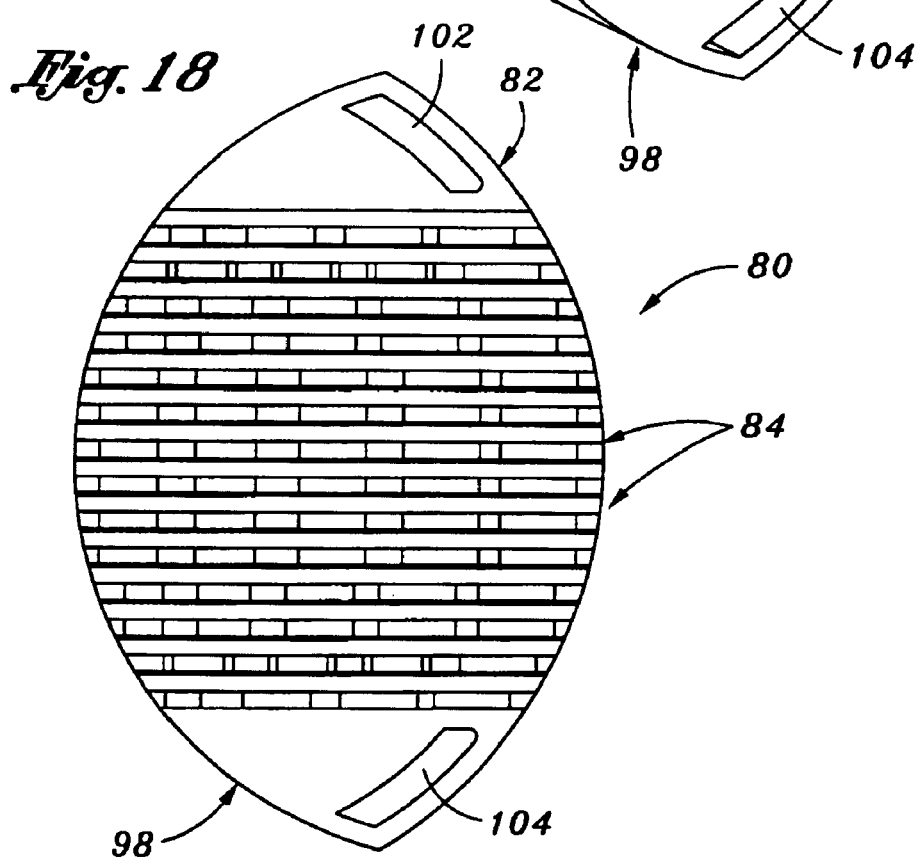
FIG. 18 is a front elevational view of the impedance assembly of the third embodiment.

After the first and second plates 106, 108 have been inserted into each of the top and bottom flow openings 102, 104, the upper and lower caps 82, 98 and impedance plate assemblies 84 of the impedance assembly are machined so as to impart to the stacked arrangement the generally elliptical profile shown in FIGS. 17 and 18. As such, the impedance assembly 80 includes an arcuate outer surface 110 collectively defined by portions of the upper and lower caps 82, 98 and impedance plate assemblies 84, and an arcuate inner surface 112 which is itself collectively defined by portions of the upper and lower caps 82, 98 and impedance plate assemblies 84. The outer and inner surfaces 110, 112 meet each other at a top apex 114 defined by the upper cap 82 and disposed adjacent the top flow opening 102, and a bottom apex 116 defined by the lower cap 98 and disposed adjacent the bottom flow opening 104. Within the machined impedance assembly 80, the tortuous passageways of greatest noise or energy attenuating capability (i.e., the tortuous passageways defining the greatest number of turns) are disposed closest to the outer surface 110, with the number of turns (and hence the noise attenuating capability) of the tortuous passageways progressively decreasing as they extend toward the inner surface 112.

Referring now to FIGS. 15 and 16, upon the impedance assembly 80 being machined in the above-described manner, the same is advanced into the bore 24 of the closure element 12. Such advancement is facilitated in a manner wherein the outer surface 110 of the impedance assembly 80 directly engages or abuts a portion of the inner surface of the closure element 12 which defines the bore 24 thereof. In this regard, it is contemplated that the contour of the outer surface 110 will be complementary to that of the inner surface of the closure element 12 defining the bore 24, such that the outer surface 110 may be brought into direct, flush engagement therewith. When properly positioned within the bore 24, a portion of the impedance assembly 80 protrudes from the inflow end 26 of the bore 24. Additionally, the inner surface 112 of the impedance assembly 80 and a portion of the inner surface of the closure element 12 defining the bore 24 thereof collectively define a generally crescent-shaped flow opening 118. The thickness of the impedance assembly 80 is substantially less than the length of the bore. Thus, when the impedance assembly 80 is properly positioned within the bore 24, the impedance assembly 80 extends to a depth which is substantially short of the rotational axis of the closure element 12 (i.e., the axis of the stem 30). It is contemplated that the impedance assembly 80 will be welded in place within the bore 24 of the closure element 12, though those of ordinary skill in the art will recognize that alternative attachment methods may also be employed.

Once the impedance assembly 80 has been properly secured within the bore 24 of the closure element 12, that portion of the impedance assembly 80 protruding from the inflow end 26 of the bore 24 is subjected to another machining operation which imparts an arcuate contour or profile thereto as needed to cause the exposed outer inflow end of the impedance assembly 80 to be substantially flush or continuous with the outer surface of the closure element 12 at the inflow end 26 of the bore 24. Stated another way, the impedance assembly 80 is machined such that the contour of the outer inflow end thereof is complementary to that of the outer surface of the closure element 12 as is best seen in FIG. 15.

Due to the configuration of the impedance assembly 80, the number of tortuous passageways exposed to flow along the axis of the flow path 18 varies as the closure element 12 is rotated from its fully closed position toward its fully open position. In this regard, when the closure element 12 is initially cracked open, fluid will flow only into those tortuous passageways of the impedance assembly 80 imparting the highest level of noise or energy attenuation. As the opening of the closure element 12 progresses, the remaining tortuous passageways of the impedance assembly 80 of lesser noise or energy attenuating capability are progressively exposed to the fluid flow. Thus, the number of tortuous passageways exposed to fluid flow progressively increases as the closure element 12 is rotated toward its fully open position.

In addition to flowing through the tortuous passageways, the fluid flows into the top and bottom flow openings 102, 104 of the impedance assembly 80 which, as indicated above, are also tortuous. The continued rotation of the closure element 12 toward its fully open position then allows fluid to flow through the flow opening 118 in an unrestricted manner. When the closure element 12 is ultimately rotated to its fully open position, a portion of the fluid flow continues to flow through the tortuous passageways and top and bottom flow openings 102, 104 of the impedance assembly concurrently with flow through the flow opening 118. Thus, like the impedance assemblies 14, 62 described above, the impedance assembly 80 of the third embodiment provides the benefits of those utilized in linear valve arrangements, yet imparts those benefits to the rotary closure element 12 of the valve 10.

One of the most significant structural distinctions between the impedance assembly 80 of the third embodiment and the impedance assemblies 14 and 62 of the first and second embodiments is that in the impedance assembly 80 of the third embodiment, the impedance plate assemblies 84 are stacked in a direction which is generally perpendicular or normal to the axis defined by the bore 24 of the closure element 12. In contrast, the feeder caps and plates of the impedance assemblies 14, 62 are stacked in a manner where they extend along the axis defined by the bore 24 of the closure element 12.

Additional modifications and improvements of the present invention may also be apparent to those of ordinary skill in the art. For example, as shown in the accompanying figures, the impedance assembly 80 of the third embodiment is formed to have a generally elliptical configuration, which results in the flow opening 118 being generally crescent-shaped when the impedance assembly 80 is advanced into the bore 24 of the closure element 12. In this regard, the impedance assembly 80 may be formed to have alternative shapes as would cause the flow opening 118 to have a shape other than a crescent shape. More particularly, the shape of the flow opening 118 can be varied by modifying the shape of the impedance assembly 80, with the shape of the flow opening 118 being selected to provide a desired flow curve characteristic. Thus, the particular combination of parts described and illustrated herein is intended to represent only certain embodiments of the present invention, and is not intended to serve as limitations of alternative devices within the spirit and scope of the invention.

The invention claimed is:

1. A valve assembly, comprising:

a rotary closure element defining an arcuate outer surface and an axis of rotation the rotary closure element being selectively moveable between a fully open position and a fully closed position;

an impedance assembly mounted to and moveable with the rotary closure element, the impedance assembly and the rotary closure element collectively defining a flow opening, with the impedance assembly defining an arcuately contoured inflow end which is substantially continuous with the outer surface of the closure element and an outflow end the impedance assembly comprising:

a plurality of impedance plate assemblies secured to each other in a stacked arrangement along an axis which is generally parallel to the axis of rotation, each of the impedance plate assemblies including a plurality of openings formed therein, the openings collectively defining a plurality of tortuous passageways which each define a series of turns and extend from the inflow end to the outflow end when the impedance plate assemblies are stacked upon each other;

the tortuous passageways and the flow opening being oriented relative to each other such that a portion of a flow through the valve assembly is directed at the inflow end and into the tortuous passageways and a portion of the flow is directed through the flow opening when the closure element is in the fully open position.

2. The valve assembly of claim 1 wherein the impedance assembly is sized and oriented relative to the closure element such that the tortuous passageways are each upstream of the axis of rotation when the closure element is in the fully open position.

3. The valve assembly of claim 1 wherein each of the impedance plate assemblies comprises:

a separator plate;

a first impedance plate having a plurality of slots and openings formed therein; and a second impedance plate having a plurality of openings formed therein;

the separator, first and second impedance plates being stacked upon each other such that the second impedance plate is disposed between the separator and the first impedance plates, with the slots and openings of the first and second impedance plates collectively defining certain ones of the tortuous passageways.

4. The valve assembly of claim 1 wherein:

the series of turns of each of the tortuous passageways extend at generally right angles relative to each other; and the tortuous passageways of the impedance assembly define differing numbers of turns.

5. The valve assembly of claim 4 wherein the impedance assembly is mounted to the closure element such that flow is applied initially to the tortuous passageways having a greater number of turns when the closure element is moved from the fully closed position toward the fully open position.

6. The valve assembly of claim 1 wherein the impedance assembly further comprises:

an upper cap; and a lower cap;

the impedance plate assemblies being stacked between the upper and lower caps.

7. The valve assembly of claim 6 wherein the upper and lower caps each include a flow opening and disposed therein and extending therethrough.

8. The valve assembly of claim 7 wherein the flow opening of each of the upper and lower caps defines a tortuous fluid flow path.

9. A valve assembly, comprising:

a rotary closure element defining an axis of rotation and selectively moveable between a fully open position and a fully closed position;

an impedance assembly mounted to and moveable with the rotary closure element, the impedance assembly and the rotary closure element collectively defining a flow opening, with the impedance assembly defining an inflow end and an outflow end and comprising:

a plurality of impedance plate assemblies secured to each other in a stacked arrangement along an axis which is generally parallel to the axis of rotation;

each of the impedance plate assemblies including a plurality of openings formed therein which collectively define a plurality of continuous fluid passageways extending from the inflow end to the outflow end when the impedance plate assemblies are stacked upon each other, the impedance plate assemblies each comprising:

a separator plate;

a first impedance plate having a plurality of slots and openings formed therein; and a second impedance plate having a plurality of openings formed therein;

the separator, first and second impedance plates being stacked upon each other such that the second impedance plate is disposed between the separator and the first impedance plates, with the slots and openings of the first and second impedance plates collectively defining certain ones of the fluid passageways;

the fluid passageways and the flow opening being oriented relative to each other such that a portion of a flow through the valve assembly is directed at the inflow end and into the fluid passageways and a portion of the flow is directed through the flow opening when the closure element is in the fully open position.

10. The valve assembly of claim 9 wherein:

the closure element defines an arcuate outer surface;

the impedance plate assemblies are configured in a manner wherein the inflow end of the impedance assembly is arcuately contoured; and the impedance assembly is mounted to the closure element such that the arcuate inflow end of the impedance assembly is substantially continuous with the outer surface of the closure element.

11. The valve assembly of claim 9 wherein the impedance assembly further comprises:

an upper cap; and a lower cap;

the impedance plate assemblies being stacked between the upper and lower caps.

12. The valve assembly of claim 11 wherein the upper and lower caps each include a flow opening and disposed therein and extending therethrough.

13. The valve assembly of claim 12 wherein the flow opening of each of the upper and lower caps defines a tortuous fluid flow path.

* * * * *